(12) United States Patent
Yang

(10) Patent No.: US 11,231,497 B2
(45) Date of Patent: Jan. 25, 2022

(54) POSITIONING METHOD AND POSITIONING APPARATUS

(71) Applicant: Huawei Technologies Co., Ltd., Shenzhen (CN)

(72) Inventor: Hui Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 220 days.

(21) Appl. No.: 16/397,996

(22) Filed: Apr. 29, 2019

(65) Prior Publication Data

US 2019/0257938 A1 Aug. 22, 2019

Related U.S. Application Data

(63) Continuation of application No. PCT/CN2017/107604, filed on Oct. 25, 2017.

(30) Foreign Application Priority Data

Oct. 31, 2016 (CN) .......................... 201610931502.5

(51) Int. Cl.
| | | |
|---|---|---|
| *G01S 13/87* | (2006.01) | |
| *H04W 64/00* | (2009.01) | |
| *G01S 5/02* | (2010.01) | |
| *H04L 1/16* | (2006.01) | |
| *H04W 4/02* | (2018.01) | |
| *G01S 5/14* | (2006.01) | |

(52) U.S. Cl.
CPC .......... *G01S 13/878* (2013.01); *G01S 5/0289* (2013.01); *G01S 5/14* (2013.01); *H04L 1/16* (2013.01); *H04W 4/02* (2013.01); *H04W 64/00* (2013.01)

(58) Field of Classification Search
CPC .................................................. G01S 13/878
See application file for complete search history.

(56) References Cited

U.S. PATENT DOCUMENTS

| 9,723,631 | B2 * | 8/2017 | Abinader, Jr. .......... G01S 11/08 |
| 2014/0022920 | A1 * | 1/2014 | Du ........................ G01S 13/765 370/252 |
| 2015/0139212 | A1 * | 5/2015 | Wang ....................... G01S 5/06 370/338 |
| 2015/0264530 | A1 | 9/2015 | Prechner et al. |

(Continued)

FOREIGN PATENT DOCUMENTS

| CN | 103179662 A | 6/2013 |
| CN | 104301868 A | 1/2015 |

(Continued)

*Primary Examiner* — Marcus E Windrich
(74) *Attorney, Agent, or Firm* — Slater Matsil, LLP

(57) ABSTRACT

A positioning method includes: obtaining first time information of a first to-be-positioned node, second time information of a second to-be-positioned node, position information of at least three collaborative nodes with known positions, and third time information of the at least three collaborative nodes with known positions; and determining position information of the first to-be-positioned node and position information of the second to-be-positioned node according to the first time information, the second time information, the third time information, and the position information of the at least three collaborative nodes with known positions.

19 Claims, 12 Drawing Sheets

(56) References Cited

U.S. PATENT DOCUMENTS

| | | | | |
|---|---|---|---|---|
| 2016/0080960 A1* | 3/2016 | Aldana | ............... | H04W 64/00 |
| | | | | 370/252 |
| 2016/0241373 A1* | 8/2016 | Marri Sridhar | ........... | G01S 5/14 |
| 2016/0255463 A1* | 9/2016 | Das | ...................... | H04W 64/00 |
| | | | | 455/456.1 |
| 2020/0081091 A1* | 3/2020 | Amin | ................... | H04W 64/00 |

FOREIGN PATENT DOCUMENTS

| | | |
|---|---|---|
| CN | 104378823 A | 2/2015 |
| CN | 105025443 A | 11/2015 |
| CN | 105980882 A | 9/2016 |

\* cited by examiner

POSITIONING METHOD AND POSITIONING APPARATUS

CROSS-REFERENCE TO RELATED APPLICATIONS

This application is a continuation of International Application No. PCT/CN2017/107604, filed on Oct. 25, 2017, which claims priority to Chinese Patent Application No. 201610931502.5, filed on Oct. 31, 2016. The disclosures of the aforementioned applications are hereby incorporated by reference in their entireties.

TECHNICAL FIELD

This application relates to the field of positioning technologies, and more specifically, to a positioning method and a positioning apparatus.

BACKGROUND

An indoor positioning technology is a technology for navigating to and tracking an indoor object in an indoor environment. Among indoor positioning technologies, a common positioning technology is a ranging-based positioning technology, and a principle of the ranging-based positioning technology is as follows: Distance measurement is performed between a to-be-positioned node and a plurality of anchor nodes, to obtain a plurality of groups of distance information, and then, a position of the to-be-positioned node is determined based on the plurality of groups of distance information and by using a positioning algorithm similar to triangulation or the like.

FIG. 1 shows a collaborative positioning framework based on FTM (Fine Timing Measurement) communication performed between an AP (anchor node) and a to-be-positioned node. In the collaborative positioning framework shown in FIG. 1, a collaborative node $S_N$ (which may be $S_2$, $S_3$, or $S_4$ in FIG. 1) located around the AP and the to-be-positioned node collaborates with the AP in positioning U that is regarded as the to-be-positioned node. A positioning process is as follows.

U sends an FTM request to the AP. After receiving the FTM request, the AP initiates FTM measurement, and sends an FTM action frame (fine timing measurement action frame). After receiving the FTM action frame, U sends a fine timing measurement response frame, for example, sends a feasible manner ACK (Acknowledgement) of the fine timing measurement response frame. In a process in which the AP sends the FTM action frame and U sends the ACK, the AP obtains a sending time of the FTM action frame and a receiving time of the ACK, U obtains a receiving time of the FTM action frame and a sending time of the ACK, and similarly, each collaborative node $S_N$ also obtains $t_2\_S_N$ and $t_3\_S_N$. $t_2\_S_N$ is a receiving time at which a collaborative node $S_N$ receives the FTM action frame, and $t_3\_S_N$ is a receiving time at which a collaborative node $S_N$ receives the ACK.

Then, each collaborative node $S_N$ sends obtained time information ($t_2\_S_N$ and $t_3\_S_N$) and position information of the collaborative node $S_N$ to the AP; the AP sends, to U, all time information, position information of the AP, and position information of each $S_N$; and U performs calculation according to the information to obtain position information of U. All the time information sent by the AP includes the time information obtained by each $S_N$, and the sending time of the FTM action frame and the receiving time of the ACK that are obtained by the AP.

However, in the collaborative positioning framework shown in FIG. 1, within a wireless communications range of the to-be-positioned node, one AP and at least two collaborative nodes $S_{Ns}$ with known positions are required, so that the to-be-positioned node can calculate its position information by using one FTM handshake with one AP. If there are N to-be-positioned nodes in the collaborative positioning framework, at least N FTM handshakes are required to obtain position information of all the to-be-positioned nodes, leading to higher signaling overheads in a network. One FTM handshake is equivalent to one interaction between two signaling FTM_K and ACK_K. The FTM_K indicates that the AP sends the FTM action frame for the $K^{th}$ time, the ACK_K indicates that a STA sends the ACK for the $K^{th}$ time, and the ACK is a feasible manner of the fine timing measurement response frame.

SUMMARY

This application provides a positioning method and a positioning apparatus, to obtain position information of two to-be-positioned nodes during one FTM handshake, to reduce signaling overheads in a network. Technical solutions are as follows:

A first aspect of this application provides a positioning method, where the positioning method includes: obtaining first time information of a first to-be-positioned node, where the first time information includes a sending time at which the first to-be-positioned node sends a fine timing measurement action frame and a first receiving time at which the first to-be-positioned node receives the fine timing measurement response frame; obtaining second time information of a second to-be-positioned node, where the second time information includes a second receiving time at which the second to-be-positioned node receives the fine timing measurement action frame and a sending time at which the second to-be-positioned node sends the fine timing measurement response frame; obtaining position information of at least three collaborative nodes with known positions and third time information of the at least three collaborative nodes with known positions, where the third time information includes receiving time at which the at least three collaborative nodes receive the fine timing measurement action frame and receiving time at which the at least three collaborative nodes receive the fine timing measurement response frame; and determining position information of the first to-be-positioned node and position information of the second to-be-positioned node according to the first time information, the second time information, the third time information, and the position information of the at least three collaborative nodes with known positions.

It can be learned that the position information of the first to-be-positioned node and the position information of the second to-be-positioned node can be obtained by using one FTM handshake between the first to-be-positioned node and the second to-be-positioned node. In this case, when there are N to-be-positioned nodes, if N is an even number, the N to-be-positioned nodes may obtain their position information by using N/2 FTM handshakes between the N to-be-positioned nodes; or if N is an odd number, the N to-be-positioned nodes may obtain their position information by using (N/2)+1 FTM handshakes between the N to-be-positioned nodes. Compared with the prior art in which position information of N to-be-positioned nodes are obtained by using 2N FTM handshakes, in this application, a quantity of FTM handshakes is decreased. Therefore, signaling overheads in a network are reduced.

A second aspect of this application provides a positioning apparatus, where the positioning apparatus includes: an obtaining unit, configured to obtain first time information of a first to-be-positioned node, where the first time information includes a sending time at which the first to-be-positioned node sends a fine timing measurement action frame and a first receiving time at which the first to-be-positioned node receives the fine timing measurement response frame, where the obtaining unit is further configured to obtain second time information of a second to-be-positioned node, where the second time information includes a second receiving time at which the second to-be-positioned node receives the fine timing measurement action frame and a sending time at which the second to-be-positioned node sends the fine timing measurement response frame; and the obtaining unit is further configured to obtain position information of at least three collaborative nodes with known positions and third time information of the at least three collaborative nodes with known positions, where the third time information includes receiving time at which the at least three collaborative nodes receive the fine timing measurement action frame and receiving time at which the at least three collaborative nodes receive the fine timing measurement response frame; and a determining unit, configured to determine position information of the first to-be-positioned node and position information of the second to-be-positioned node according to the first time information, the second time information, the third time information, and the position information of the at least three collaborative nodes with known positions that are obtained by the obtaining unit.

It can be learned that the position information of the first to-be-positioned node and the position information of the second to-be-positioned node can be obtained by using one FTM handshake between the first to-be-positioned node and the second to-be-positioned node. In this case, when there are N to-be-positioned nodes, if N is an even number, the N to-be-positioned nodes may obtain their position information by using N/2 FTM handshakes between the N to-be-positioned nodes; or if N is an odd number, the N to-be-positioned nodes may obtain their position information by using (N/2)+1 FTM handshakes between the N to-be-positioned nodes. Compared with the prior art in which position information of N to-be-positioned nodes are obtained by using 2N FTM handshakes, in this application, a quantity of FTM handshakes is decreased. Therefore, signaling overheads in a network are reduced.

In an implementation, the determining position information of the first to-be-positioned node and position information of the second to-be-positioned node according to the first time information, the second time information, the third time information, and the position information of the at least three collaborative nodes with known positions includes: determining a time of flight between the first to-be-positioned node and the second to-be-positioned node according to the first time information and the second time information; determining a time of flight difference between a time of flight between each of the at least three collaborative nodes with known positions and the first to-be-positioned node, and a time of flight between each of the at least three collaborative nodes with known positions and the second to-be-positioned node according to the time of flight between the first to-be-positioned node and the second to-be-positioned node, the first time information, and the third time information, where the time of flight difference includes a difference between a time of flight between any one of the at least three collaborative nodes with known positions and the first to-be-positioned node, and a time of flight between the any one collaborative node and the second to-be-positioned node; and determining the position information of the first to-be-positioned node and the position information of the second to-be-positioned node according to the time of flight difference, the position information of the at least three collaborative nodes with known positions, and the time of flight between the first to-be-positioned node and the second to-be-positioned node.

In an implementation, the positioning method is executed by the first to-be-positioned node, so that the first to-be-positioned node determines the position information of the first to-be-positioned node and the position information of the second to-be-positioned node, thereby reducing a calculation amount of the second to-be-positioned node; the obtaining first time information of a first to-be-positioned node includes: sending the fine timing measurement action frame, and obtaining the sending time of the timing measurement action frame; and receiving the fine timing measurement response frame sent by the second to-be-positioned node, and obtaining the second receiving time; and the obtaining second time information of a second to-be-positioned node includes: receiving the second time information sent by the second to-be-positioned node.

In an implementation, the positioning method is executed by the second to-be-positioned node, so that the second to-be-positioned node determines the position information of the first to-be-positioned node and the position information of the second to-be-positioned node, thereby reducing a calculation amount of the first to-be-positioned node; the obtaining second time information of a second to-be-positioned node includes: receiving the fine timing measurement action frame sent by the first to-be-positioned node, and obtaining the first receiving time; and sending the fine timing measurement response frame, and obtaining the sending time of the fine timing measurement response frame; and the obtaining first time information of a first to-be-positioned node includes: receiving the first time information sent by the first to-be-positioned node.

In an implementation, the obtaining position information of at least three collaborative nodes with known positions and third time information of the at least three collaborative nodes with known positions includes: receiving the position information of the at least three collaborative nodes and the third time information that are sent by the at least three collaborative nodes.

In an implementation, the positioning method is executed by the any one of the at least three collaborative nodes with known positions, so that the any collaborative node determines the position information of the first to-be-positioned node and the position information of the second to-be-positioned node, thereby reducing calculation amounts of the first to-be-positioned node and the second to-be-positioned node; the obtaining first time information of a first to-be-positioned node includes: receiving the first time information sent by the first to-be-positioned node; the obtaining second time information of a second to-be-positioned node includes: receiving the second time information sent by the second to-be-positioned node; and the obtaining position information of at least three collaborative nodes with known positions and third time information of the at least three collaborative nodes with known positions includes: obtaining position information of the any collaborative node; receiving the fine timing measurement action frame sent by the first to-be-positioned node, and obtaining a receiving time at which the any collaborative node receives the fine timing measurement action frame; receiving the fine timing measurement response frame sent by the second to-be-positioned node, and obtaining a receiving time at which the any collaborative node receives the fine timing measurement response frame; and receiving position information of other collaborative nodes of the at least three collaborative nodes that is sent by the other collaborative nodes, receiving time at which the other collaborative nodes receive the fine timing measurement action frame, and receiving time at which the other collaborative nodes receive the fine timing measurement response frame.

In an implementation, the positioning method is executed by a management node, so that the management node determines the position information of the first to-be-positioned node and the position information of the second to-be-positioned node, thereby reducing calculation amounts of the first to-be-positioned node and the second to-be-positioned node; the obtaining first time information of a first to-be-positioned node includes: receiving the first time information sent by the first to-be-positioned node; the obtaining second time information of a second to-be-positioned node includes: receiving the second time information sent by the second to-be-positioned node; and the obtaining position information of at least three collaborative nodes with known positions and third time information of the at least three collaborative nodes with known positions includes: receiving the position information of the at least three collaborative nodes and the third time information that are sent by the at least three collaborative nodes.

In an implementation, the positioning method is executed by the first to-be-positioned node, and the positioning method further includes: sending the position information of the second to-be-positioned node to the second to-be-positioned node; or the positioning method is executed by the second to-be-positioned node, and the positioning method further includes: sending the position information of the first to-be-positioned node to the first to-be-positioned node; or the positioning method is executed by the any one of the at least three collaborative nodes with known positions or a management node, and the positioning method further includes: sending the position information of the first to-be-positioned node to the first to-be-positioned node, and sending the position information of the second to-be-positioned node to the second to-be-positioned node.

In an implementation, the positioning method is executed by the first to-be-positioned node, and the positioning method further includes: determining the second to-be-positioned node that performs fine timing measurement with the first to-be-positioned node.

In an implementation, the determining the second to-be-positioned node that performs fine timing measurement with the first to-be-positioned node includes: sending a signaling request to a management node, where the signaling request is used to request to perform fine timing measurement; and receiving a response message sent by the management node, where the response message is used to instruct to perform fine timing measurement between the first to-be-positioned node and the second to-be-positioned node, to determine the second to-be-positioned node; or sending a ranging request in a broadcast mode; and receiving a ranging response message sent by the second to-be-positioned node, to determine the second to-be-positioned node.

In an implementation, the determining a time of flight difference between a time of flight between each of the at least three collaborative nodes with known positions and the first to-be-positioned node, and a time of flight between each of the at least three collaborative nodes with known positions and the second to-be-positioned node according to the time of flight between the first to-be-positioned node and the second to-be-positioned node, the first time information, and the third time information includes: obtaining the difference between the time of flight between the any collaborative node SN and the first to-be-positioned node $U_1$, and the time of flight between SN and the second to-be-positioned node $U_2$ according to the following formula: $TOF(U_1-S_N)-TOF(U_2-S_N)=t_2\_S_N-t_3\_S_N+(t_4-t_1)-TOF(U_1-U_2)$ where $TOF(U_1-U_2)$ indicates the time of flight between the first to-be-positioned node and the second to-be-positioned node, $TOF(U_1-S_N)$ indicates the time of flight between the any collaborative node SN and the first to-be-positioned node $U_1$, $TOF(U_2-S_N)$ indicates the time of flight between the any collaborative node SN and the second to-be-positioned node $U_2$, $t_1$ indicates the sending time at which the first to-be-positioned node sends the fine timing measurement action frame, $t_4$ indicates the first receiving time, $t_2\_S_N$ indicates a receiving time at which SN receives the fine timing measurement action frame, and $t_3\_S_N$ indicates a receiving time at which SN receives the fine timing measurement response frame.

In an implementation, the determining the position information of the first to-be-positioned node and the position information of the second to-be-positioned node according to the time of flight difference, the position information of the at least three collaborative nodes with known positions, and the time of flight between the first to-be-positioned node and the second to-be-positioned node includes: calculating coordinates of the first to-be-positioned node and coordinates of the second to-be-positioned node according to the following two formulas:

$$\sqrt{(a_N-x_1)^2+(b_N-y_1)^2}-\sqrt{(a_N-x_2)^2+(b_N-y_2)^2}=(TOF(U_1-S_N)-TOF(U_2-S_N))*c;$$

and $$\sqrt{(x_2-x_1)^2(y_2-y_1)^2}=TOF(U_1-U_2)*c$$

An error caused because internal clocks of the first to-be-positioned node, the second to-be-positioned node, and the at least three collaborative nodes with known positions cannot be aligned can be eliminated by using the foregoing two formulas, thereby improving calculation precision. In the foregoing formulas, $(x_1,y_1)$ indicates the coordinates of the first to-be-positioned node, to represent the position information of the first to-be-positioned node; $(x_2,y_2)$ indicates the coordinates of the first to-be-positioned node, to represent the position information of the second to-be-positioned node; $(a_N,b_N)$ indicates coordinates of $S_N$, to represent the position information of the any collaborative node $S_N$; c indicates a speed of light, and c is equal to $3*10^8$; $t_2$ indicates the second receiving time; $t_3$ indicates the sending time at which the second to-be-positioned node sends the fine timing measurement response frame; and $TOF(U_1-U_2)$ indicates the time of flight between the first to-be-positioned node $U_1$ and the second to-be-positioned node $U_2$.

A third aspect of this application provides a positioning device, where the positioning device includes a memory, a processor, a receiver, and a transmitter, and the processor is configured to execute the positioning method provided in the first aspect and all the foregoing implementations.

A fourth aspect of this application provides a storage medium, where the storage medium records program code used for executing the positioning method provided in the first aspect and all the foregoing implementations.

BRIEF DESCRIPTION OF THE DRAWINGS

To describe the technical solutions in the embodiments of this application more clearly, the following briefly describes the accompanying drawings required for describing the embodiments.

DETAILED DESCRIPTION OF ILLUSTRATIVE EMBODIMENTS

Figure 1:
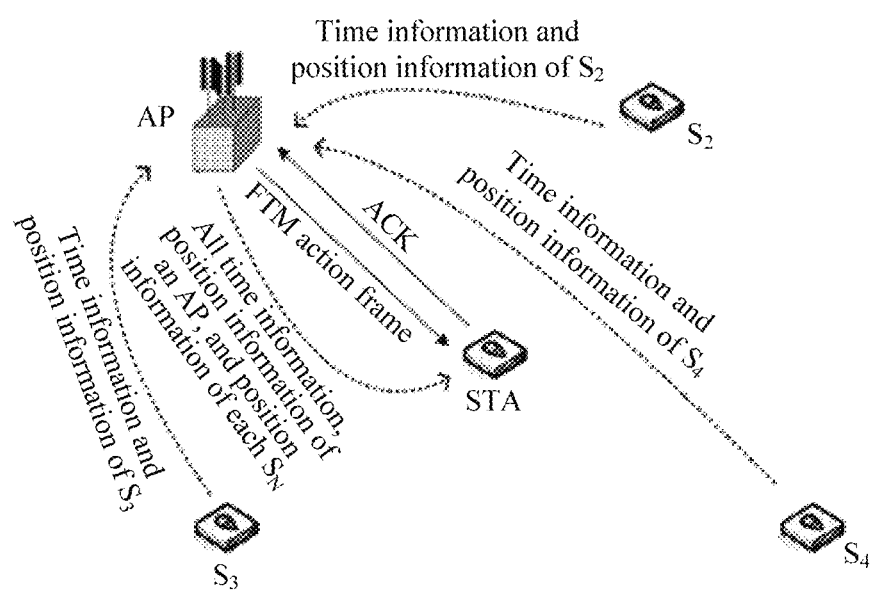
FIG. 1 is a schematic diagram of a collaborative positioning framework.

FIG. 1 shows a collaborative positioning framework in which a to-be-positioned node U resides. In this collaborative positioning framework, within a wireless communications range of U, there is one AP and a plurality of collaborative nodes SNs with known positions, for example, collaborative nodes S2, S3, and S4 in FIG. 1. The collaborative nodes SNs participate in one FTM handshake between U and the AP. Each collaborative node SN obtains a receiving time at which FTM_K is received and a receiving time at which ACK_K is received, so that U calculates its position information based on the receiving time, time information of the AP, position information of the AP, and position information of each collaborative node SN. However, when there are N Us in the collaborative positioning framework, at least N FTM handshakes are required to obtain position information of all Us, leading to higher signaling overheads in a network.

Figure 2:
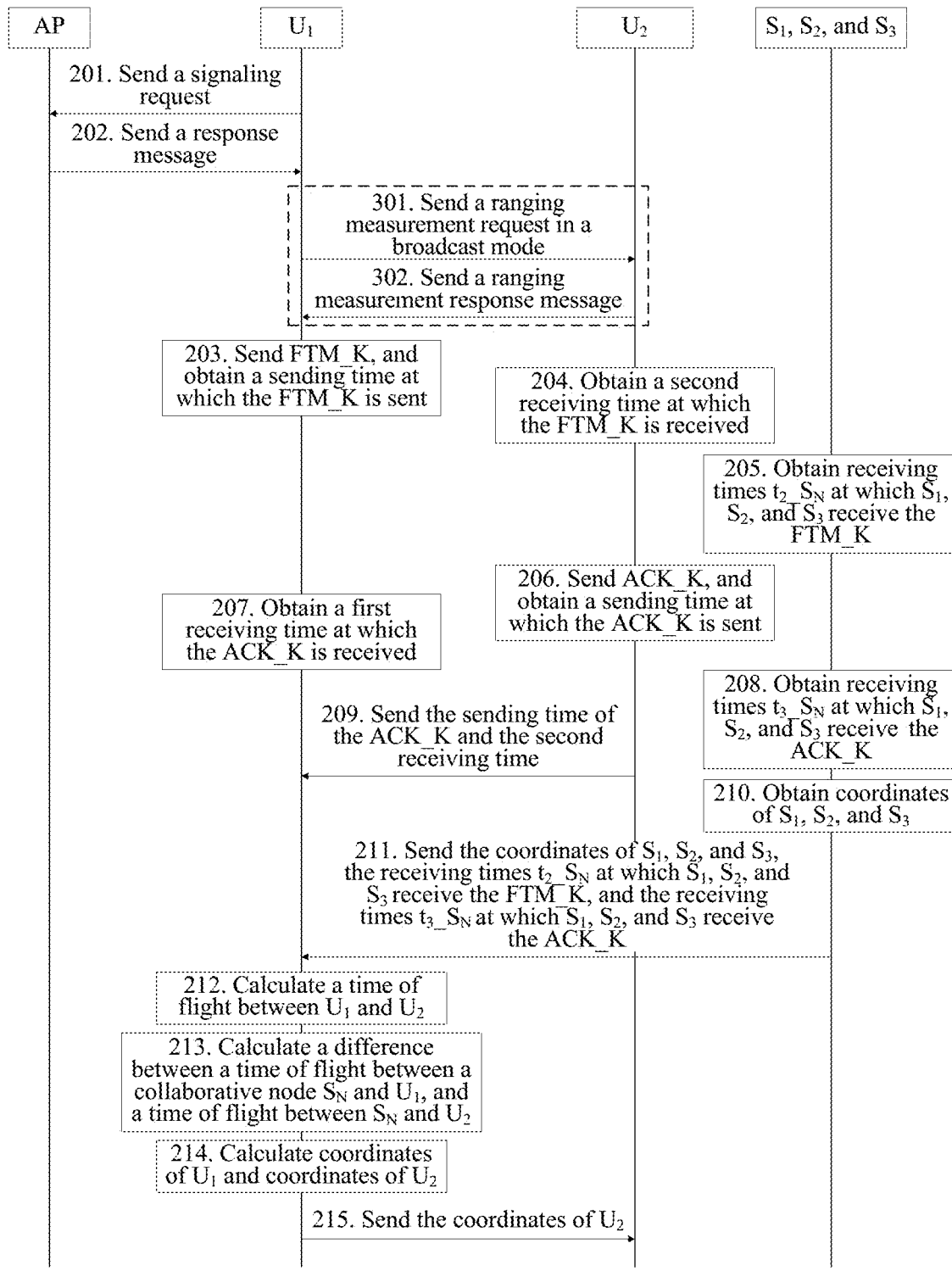
FIG. 2 is a signaling interaction diagram of a positioning method according to an embodiment of this application.

With reference to the collaborative positioning framework shown in FIG. 1, an embodiment of this application provides a positioning method shown in FIG. 2. In FIG. 2, U1 is a first to-be-positioned node, U2 is a second to-be-positioned node, and SN is a collaborative node. In addition, to obtain position information of U1 and position information of U2 during one FTM handshake, at least three SNs with known positions are required. In FIG. 2, an example in which there are three SNs with known positions and the three SNs with known positions are S1, S2, and S3 is used for description. The positioning method shown in FIG. 2 is executed by U1, and includes the following steps.

201. U1 sends a signaling request to an AP, where the signaling request is used to request to perform fine timing measurement.

202. The AP sends a response message to U1, where the response message is used to instruct to perform fine timing measurement between U1 and U2, to determine U2.

In this embodiment of this application, the AP is a management node that manages collaborative positioning performed by the collaborative nodes SNs on U1 and U2. The AP may instruct to perform fine timing measurement between any two to-be-positioned nodes Us, and a standard for instructing, by the AP, to perform fine timing measurement between the any two to-be-positioned nodes Us may be as follows: The two to-be-positioned nodes Us can communicate with each other. For example, in step 202, U2 that can bidirectionally communicate with U1 is specified in the response message sent by the AP to U1, so that after step 201 and step 202, U1 determines U2 that performs fine timing measurement with U1.

Certainly, U1 may alternatively determine, in another manner, U2 that performs fine timing measurement with U1. As shown in step 301 and step 302 in FIG. 2, U1 sends a ranging request in a broadcast mode, and after receiving the ranging request, U2 within a wireless communications range of U1 sends a ranging response message to U1. Then, U1 can perform fine timing measurement with U2.

203. U1 sends FTM_K, and obtains a sending time t1 of the FTM_K.

204. U2 obtains a second receiving time t2 at which the FTM_K is received.

205. The collaborative nodes S1, S2, and S3 obtain receiving time t2_SN at which the collaborative nodes S1, S2, and S3 receive the FTM_K. The receiving time t2_SN of the collaborative nodes S1, S2, and S3 are marked as t2_S1, t2_S2, and t2_S3, respectively.

Figure 3:
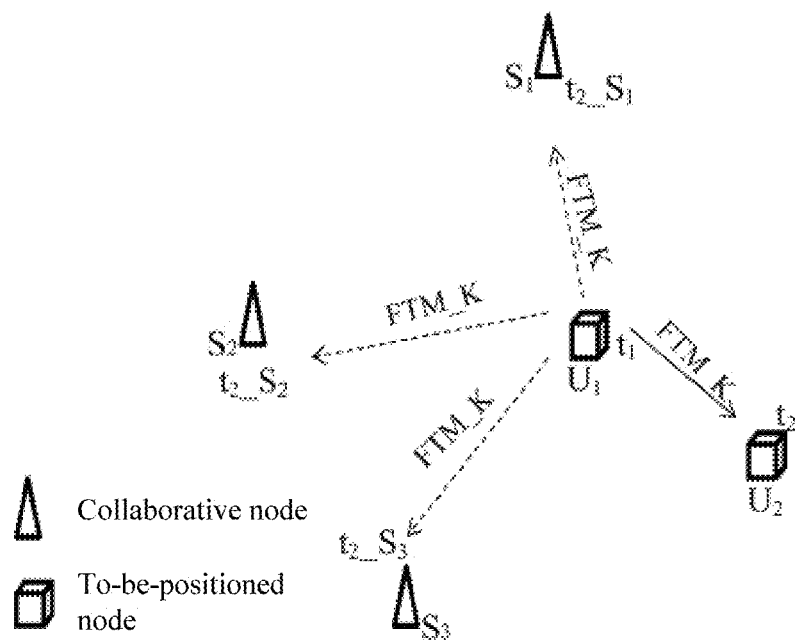
FIG. 3 is a signaling diagram of step 203 to step 205 in the positioning method shown in FIG. 2.

Step 203 to step 205 shown in FIG. 2 may be demonstrated by a signaling diagram shown in FIG. 3. The FTM_K sent by U1 is received by U2 and the collaborative nodes S1, S2, and S3. Then, U2 may obtain the second receiving time t2 at which the FTM_K is received, and the collaborative nodes S1, S2, and S3 obtain the receiving time t2_SN at which the collaborative nodes S1, S2, and S3 receive the FTM_K.

206. U2 sends ACK_K, and obtains a sending time t3 of the ACK_K.

207. U1 obtains a first receiving time t4 at which the ACK_K is received.

208. The collaborative nodes S1, S2, and S3 obtain receiving time t3_SN at which the collaborative nodes S1, S2, and S3 receive the ACK_K. The receiving time t3_SN of the collaborative nodes S1, S2, and S3 are marked as t3_S1, t3_S2, and t3_S3, respectively.

Figure 4:
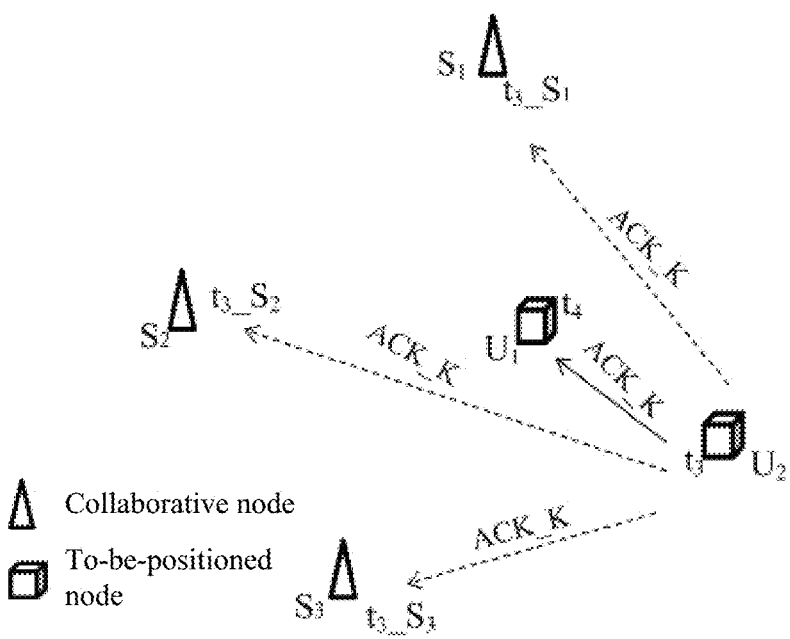
FIG. 4 is a signaling diagram of step 206 to step 208 in the positioning method shown in FIG. 2.

Step 206 to step 208 shown in FIG. 2 may be demonstrated by a signaling diagram shown in FIG. 4. The ACK_K sent by U2 is received by U1 and the collaborative nodes S1, S2, and S3. Then, U1 may obtain the first receiving time t4 at which the ACK_K is received, and the collaborative nodes S1, S2, and S3 obtain the receiving time t3_SN at which the collaborative nodes S1, S2, and S3 receive the ACK_K.

209. U2 sends the sending time t3 of the ACK_K and the second receiving time t2 to U1.

After step 203 to step 209, U1 can obtain first time information of U1 and second time information of U2. The first time information includes the sending time at which U1 sends the FTM_K and the first receiving time at which U1 receives the ACK_K. The second time information includes the second receiving time at which U2 receives the FTM_K and the sending time at which U2 sends the ACK_K.

210. The collaborative nodes S1, S2, and S3 obtain their coordinates, where the coordinates are used to represent position information of the collaborative nodes.

211. The collaborative nodes S1, S2, and S3 send, to U1, their coordinates, the receiving time t2_SN at which the collaborative nodes S1, S2, and S3 receive the FTM_K, and the receiving time t3_SN at which the collaborative nodes S1, S2, and S3 receive the ACK_K.

Figure 5:
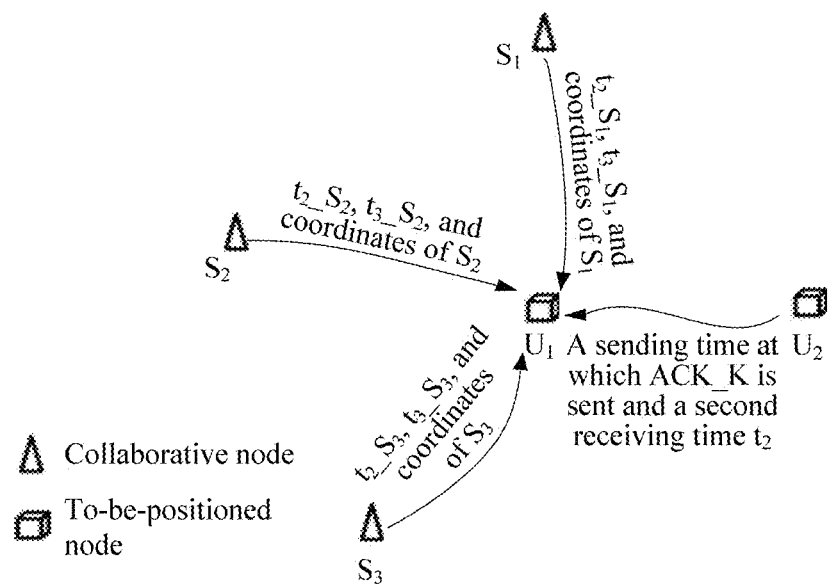
FIG. 5 is a signaling diagram of step 209 and step 210 in the positioning method shown in FIG. 2.

Step 209 and step 211 shown in FIG. 2 may be demonstrated by a signaling diagram shown in FIG. 5. U1 receives the sending time t3 at which U2 sends the ACK_K and the second receiving time t2, and receives the position information of the collaborative nodes S1, S2, and S3, the receiving time t2_SN at which the collaborative nodes S1, S2, and S3 receive the FTM_K, and the receiving time t3_SN at which the collaborative nodes S1, S2, and S3 receive the ACK_K that are sent by the collaborative nodes S1, S2, and S3.

In addition, after step 205, step 208, step 210, and step 211, U1 can obtain the position information of the collaborative nodes S1, S2, and S3 with known positions and third time information. The third time information includes the receiving time t2_SN at which the three collaborative nodes S1, S2, and S3 receive the FTM_K, and the receiving time t3_SN at which the three collaborative nodes S1, S2, and S3 receive the ACK_K.

212. U1 calculates a time of flight between U1 and U2 according to Formula 1:

$$TOF(U_1-U_2)=((t4-t1)-(t3-t2))/2 \quad \text{(Formula 1)}.$$

213. U1 calculates a difference between a time of flight between a collaborative node $S_N$ and $U_1$, and a time of flight between $S_N$ and $U_2$ according to Formula 2:

$$TOF(U_1-S_N)-TOF(U_2-S_N)=t_{2\_S_N}-t_{3\_S_N}+(t_4-t_1)-TOF(U_1-U_2), \quad \text{(Formula 2)}$$

where $TOF(U_1-S_N)$ indicates the time of flight between $S_N$ and $U_1$, and $TOF(U_2-S_N)$ indicates the time of flight between $S_N$ and $U_2$.

A process of deriving Formula 2 is as follows:

$$t_{2\_S_N}=t+TOF(U_1-S_N)+\Delta(U_1-S_N)$$

$$t_2=t_1+TOF(U_1-U_2)+\Delta(U_1-U_2)$$

$$t_{3\_S_N}=t_3+TOF(U_2-S_N)+\Delta(U_2-S_N)$$

$$t_4=t_3+TOF(U_2-U_1)+\Delta(U_2-U_1)$$

$$\Rightarrow t_{3\_S_N}-t_{2\_S_N}=t_3-t_1+TOF(U_2-S_N)-TOF(U_1-S_N)+\Delta(U_2-U_1),$$

where $\Delta(U_2-U_1)=t_4-t_3-TOF(U_2-U_1)$ $$\Rightarrow TOF(U_1-S_N)-TOF(U_2-S_N)=t_{2\_S_N}-t_{3\_S_N}+(t_4-t_1)-TOF(U_2-U_1)$$

In a symmetric link, $TOF(U_2-U_1)=TOF(U_1-U_2)$. Therefore, the following formula is obtained:

$$TOF(U_1-S_N)-TOF(U_2-S_N)=t_{2\_S_N}-t_{3\_S_N}+(t_4-t_1)-TOF(U_2-U_1)$$

$$=TOF(U_1-S_N)-TOF(U_2-S_N)=t_{2\_S_N}-t_{3\_S_N}+(t_4-t_1)-TOF(U_1-U_2),$$

where both $TOF(U_2-U_1)$ and $TOF(U_1-U_2)$ indicate the time of flight between $U_1$ and $U_2$, while a difference between $TOF(U_2-U_1)$ and $TOF(U_1-U_2)$ lies in that: $TOF(U_1-U_2)$ indicates that calculation is proactively initiated by $U_1$ and $TOF(U_2-U_1)$ indicates that calculation is proactively initiated by $U_2$.

214. $U_1$ calculates coordinates of $U_1$ and coordinates of $U_2$ according to Formula 3 and Formula 4, where in this embodiment of this application, the coordinates of $U_1$ are used to represent position information of $U_1$, and the coordinates of $U_2$ are used to represent position information of $U_2$:

$$\sqrt{(a_N-x_1)^2+(b_N-y_1)^2}-\sqrt{(a_N-x_2)^2+(b_N-y_2)^2}=(TOF(U_1-S_N)-TOF(U_2-S_N))*c, \quad \text{(Formula 3)}$$

$$\sqrt{(x_2-x_1)^2+(y_2-y_1)^2}=TOF(U_1-U_2)*c. \quad \text{(Formula 4)}$$

In the foregoing formulas, $(x_1,y_1)$ indicates the coordinates of $U_1$, $(x_2,y_2)$ indicates the coordinates of $U_2$, $(a_N,b_N)$ indicates coordinates of $S_N$, c indicates a speed of light, and c is equal to $3*10^8$. It can be learned from Formula 1, Formula 2, Formula 3, and Formula 4 that, right sides of equations of Formula 3 and Formula 4 may be obtained by multiplying the foregoing time information and the speed of light. In addition, Formula 3 and Formula 4 include four unknown quantities: $x_1$, $y_1$, $x_2$, and $y_2$, and therefore, at least four equations are required, that is, at least coordinates of the three $S_N$s, $t_{2\_S_N}$, and $t_{3\_S_N}$ are required to simultaneously calculate the coordinates of $U_1$ and the coordinates of $U_2$ according to Formula 3 and Formula 4.

215. $U_1$ sends the coordinates of $U_2$ to $U_2$.

It can be learned from the foregoing technical solution that, according to the positioning method provided in this embodiment of this application, the coordinates of $U_1$ and the coordinates of $U_2$ can be obtained by using one FTM handshake between $U_1$ and $U_2$. In this case, when there are N to-be-positioned nodes, if N is an even number, the N to-be-positioned nodes may obtain their coordinates by using N/2 FTM handshakes between the N to-be-positioned nodes; or if N is an odd number, the N to-be-positioned nodes may obtain their coordinates by using (N/2)+1 FTM handshakes between the N to-be-positioned nodes. Compared with the prior art in which coordinates of N to-be-positioned nodes are obtained by using 2N FTM handshakes, in this application, a quantity of FTM handshakes is decreased. Therefore, signaling overheads in a network are reduced.

Figure 6:
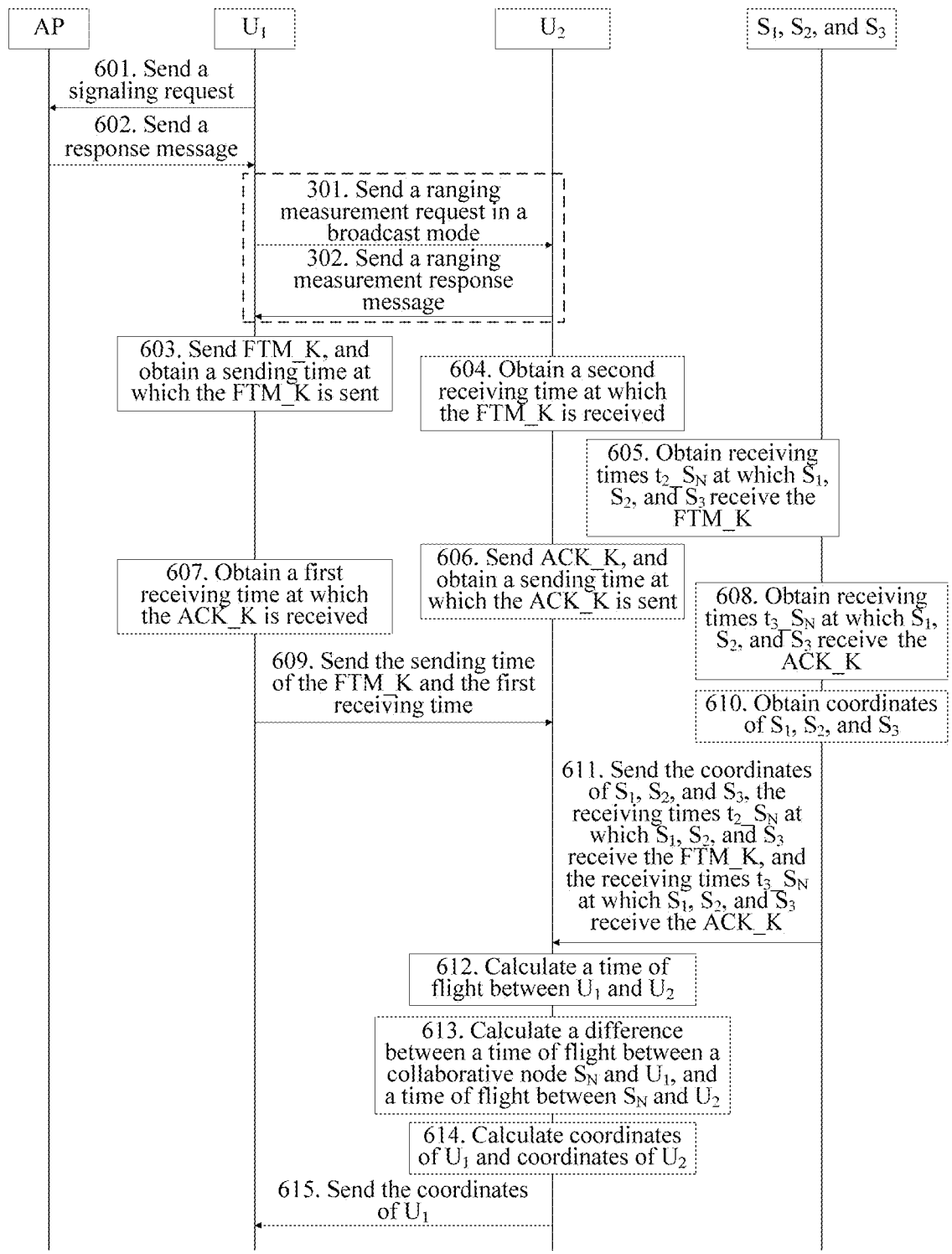
FIG. 6 is another signaling interaction diagram of a positioning method according to an embodiment of this application.

Referring to FIG. 6, FIG. 6 is another signaling interaction diagram of a positioning method according to an embodiment of this application. Compared with the positioning method shown in FIG. 2, the positioning method shown in FIG. 6 is executed by the second to-be-positioned node $U_2$ instead of being executed by the first to-be-positioned node $U_1$, so that $U_2$ calculates coordinates of $U_1$ and coordinates of $U_2$ according to Formula 1, Formula 2, Formula 3, and Formula 4, and $U_2$ sends the coordinates of $U_1$ to $U_1$, as described in step 612 to step 615.

In addition, other differences between the positioning method shown in FIG. 6 and the positioning method shown in FIG. 2 lie in the following:

$U_2$ does not send a sending time $t_3$ of ACK_K and a second receiving time $t_2$ to $U_1$;

$U_1$ sends a sending time $t_1$ of FTM_K and a first receiving time $t_4$ to $U_2$, as described in step 609, so that $U_2$ obtains first time information; and the collaborative nodes $S_1$, $S_2$, and $S_3$ send, to $U_2$, their coordinates, receiving time $t_2\_S_N$ at which the collaborative nodes $S_1$, $S_2$, and $S_3$ receive the FTM_K, and receiving time $t_3\_S_N$ at which the collaborative nodes $S_1$, $S_2$, and $S_3$ receive the ACK_K, as described in step 611, instead of sending, to $U_1$, their coordinates, the receiving time $t_2\_S_N$ at which the collaborative nodes $S_1$, $S_2$, and $S_3$ receive the FTM_K, and the receiving time $t_3\_S_N$ at which the collaborative nodes $S_1$, $S_2$, and $S_3$ receive the ACK_K, so that $U_2$ obtains position information of the three collaborative nodes $S_1$, $S_2$, and $S_3$ with known positions and third time information.

Figure 7:
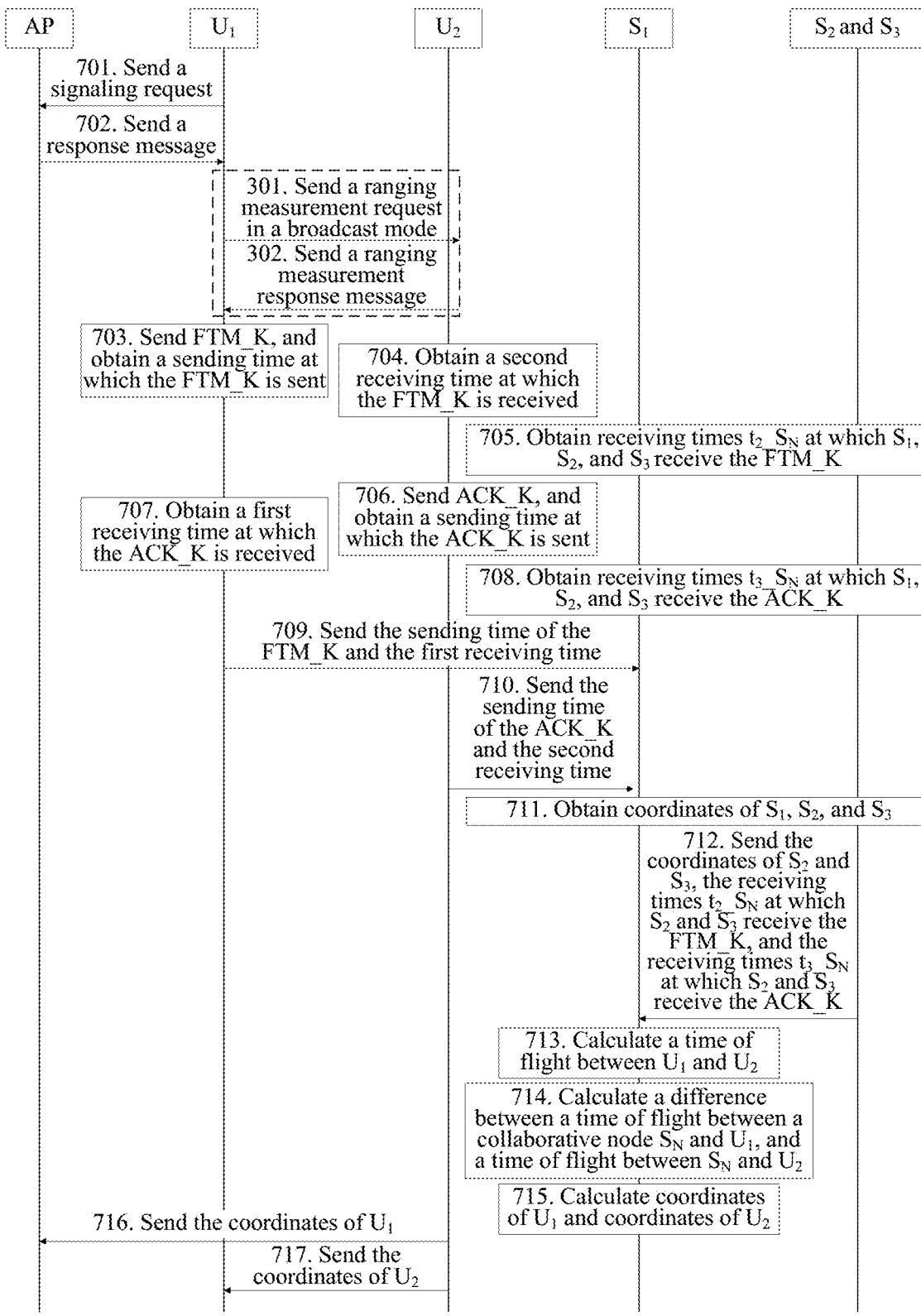
FIG. 7 is still another signaling interaction diagram of a positioning method according to an embodiment of this application.

Referring to FIG. 7, FIG. 7 is still another signaling interaction diagram of a positioning method according to an embodiment of this application. Compared with the positioning method shown in FIG. 2, the positioning method shown in FIG. 7 is executed by any one of the three collaborative nodes $S_1$, $S_2$, and $S_3$ with known positions, for example, executed by $S_1$, instead of being executed by the first to-be-positioned node $U_1$, so that $S_1$ calculates coordinates of $U_1$ and coordinates of $U_2$ according to Formula 1, Formula 2, Formula 3, and Formula 4, and $S_1$ sends the coordinates of $U_1$ to $U_1$ and sends the coordinates of $U_2$ to $U_2$, as described in step 713 to step 717.

In addition, other differences between the positioning method shown in FIG. 7 and the positioning method shown in FIG. 2 lie in the following:

$U_1$ sends a sending time $t_1$ of FTM_K and a first receiving time $t_4$ to $S_1$, as described in step 709, so that S obtains first time information;

$U_2$ sends a sending time $t_3$ of ACK_K and a second receiving time $t_2$ to $S_1$, as described in step 710, instead of sending, by $U_2$, the sending time $t_3$ of the ACK_K and the second receiving time $t_2$ to $U_1$, so that $S_1$ obtains second time information; and $S_1$ does not send, to $U_1$, its coordinates, a receiving time $t_2\_S_N$ at which the FTM_K is received, and a receiving time $t_3\_S_N$ at which the ACK_K is received; and the collaborative nodes $S_2$ and $S_3$ send, to $S_1$, their coordinates, receiving time $t_2\_S_N$ at which the collaborative nodes $S_2$ and $S_3$ receive the FTM_K, and receiving time $t_3\_S_N$ at which the collaborative nodes $S_2$ and $S_3$ receive the ACK_K, as described in step 712, instead of sending, to $U_1$, their coordinates, the receiving time $t_2\_S_N$ at which the collaborative nodes $S_2$ and $S_3$ receive the FTM_$K_3$, and the receiving time $t_3\_S_N$ at which the collaborative nodes $S_2$ and $S_3$ receive the ACK_K, so that $S_1$ obtains position information of the three collaborative nodes $S_1$, $S_2$, and $S_3$ with known positions and third time information.

Figure 8:
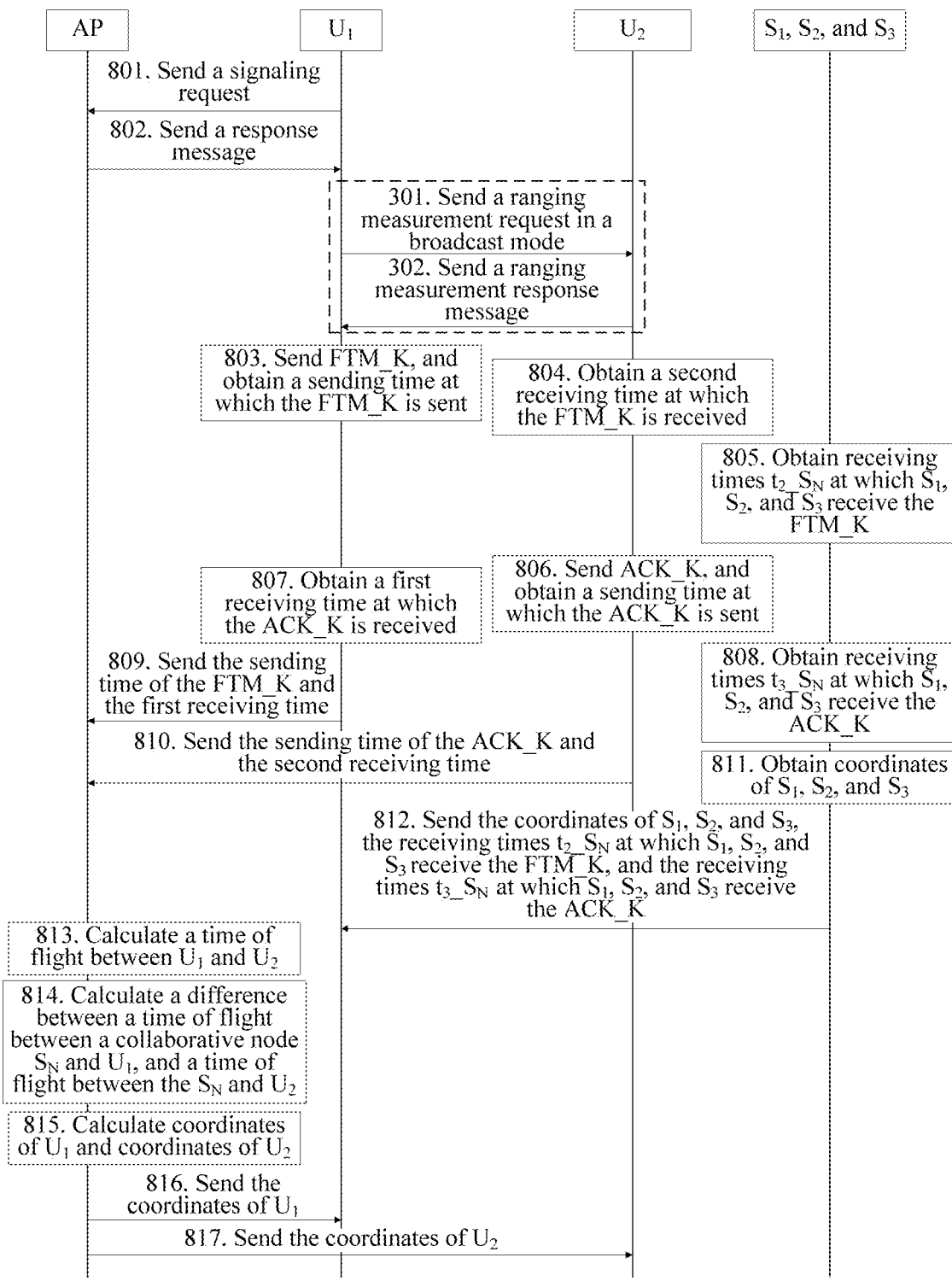
FIG. 8 is still another signaling interaction diagram of a positioning method according to an embodiment of this application.

Referring to FIG. 8, FIG. 8 is still another signaling interaction diagram of a positioning method according to an embodiment of this application. Compared with the positioning method shown in FIG. 2, the positioning method shown in FIG. 8 is executed by the management node, for example, executed by an AP in FIG. 8, instead of being executed by the first to-be-positioned node $U_1$, so that the AP calculates coordinates of $U_1$ and coordinates of $U_2$ according to Formula 1, Formula 2, Formula 3, and Formula 4, and the AP sends the coordinates of $U_1$ to $U_1$ and sends the coordinates of $U_2$ to $U_2$, as described in step 813 to step 817.

In addition, other differences between the positioning method shown in FIG. 8 and the positioning method shown in FIG. 2 lie in the following:

$U_1$ sends a sending time $t_1$ of FTM_K and a first receiving time $t_4$ to the AP, as described in step 809, so that the AP obtains first time information;

$U_2$ sends a sending time $t_3$ of ACK_K and a second receiving time $t_2$ to the AP, as described in step 810, instead of sending, by $U_2$, the sending time $t_3$ of the ACK_K and the second receiving time $t_2$ to $U_1$, so that the AP obtains second time information; and the collaborative nodes $S_1$, $S_2$, and $S_3$ send, to the AP, their coordinates, receiving time $t_2\_S_N$ at which the collaborative nodes $S_1$, $S_2$, and $S_3$ receive the FTM_K, and receiving time $t_3\_S_N$ at which the collaborative nodes $S_1$, $S_2$, and $S_3$ receive the ACK_K, as described in step 812, instead of sending, to $U_1$, their coordinates, the receiving time $t_2\_S_N$ at which the collaborative nodes $S_1$, $S_2$, and $S_3$ receive the FTM_K, and the receiving time $t_3\_S_N$ at which the collaborative nodes $S_1$, $S_2$, and $S_3$ receive the ACK_K, so that the AP obtains position information of the three collaborative nodes $S_1$, $S_2$, and $S_3$ with known positions and third time information.

Figure 9:
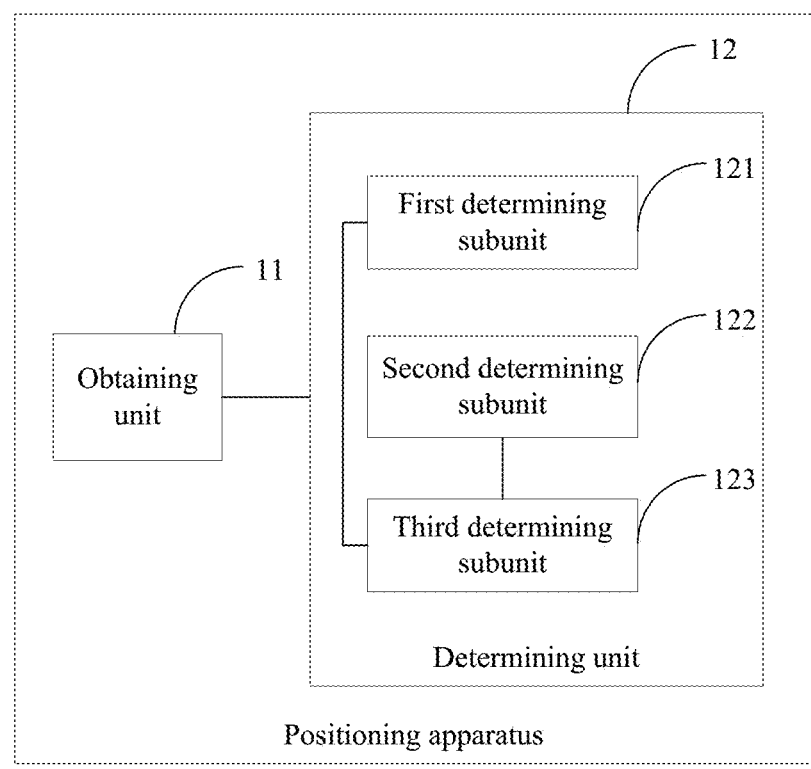
FIG. 9 is a schematic structural diagram of a positioning apparatus according to an embodiment of this application.

With reference to the collaborative positioning framework shown in FIG. 1, an embodiment of this application provides a positioning apparatus shown in FIG. 9. The positioning apparatus may include an obtaining unit 11 and a determining unit 12.

The obtaining unit 11 is configured to obtain first time information of a first to-be-positioned node, where the first time information includes a sending time at which the first to-be-positioned node sends a fine timing measurement action frame and a first receiving time at which the first to-be-positioned node receives a fine timing measurement response frame.

The obtaining unit 11 is further configured to obtain second time information of a second to-be-positioned node, where the second time information includes a second receiving time at which the second to-be-positioned node receives the fine timing measurement action frame and a sending time at which the second to-be-positioned node sends the fine timing measurement response frame.

The obtaining unit 11 is further configured to obtain position information of at least three collaborative nodes with known positions and third time information of the at least three collaborative nodes with known positions, where the third time information includes receiving time at which the at least three collaborative nodes receive the fine timing measurement action frame and receiving time at which the at least three collaborative nodes receive the fine timing measurement response frame.

The determining unit 12 is configured to determine position information of the first to-be-positioned node and position information of the second to-be-positioned node according to the first time information, the second time information, the third time information, and the position information of the at least three collaborative nodes with known positions that are obtained by the obtaining unit 11.

In an implementation, the determining unit 12 includes a first determining subunit 121, a second determining subunit 122, and a third determining subunit 123, as shown in FIG. 9.

The first determining subunit 121 is configured to determine a time of flight between the first to-be-positioned node and the second to-be-positioned node according to the first time information and the second time information. In an implementation, the first determining subunit calculates a time of flight TOF ($U_1$–$U_2$) between $U_1$ and $U_2$ according to Formula 1:

$$TOF(U_1-U_2)=((t_4-t_1)-(t_3-t_2))/2 \quad \text{(Formula 1)},$$

where $U_1$ indicates the first to-be-positioned node $U_1$, $U_2$ indicates the second to-be-positioned node $U_2$, $t_1$ indicates the sending time at which the first to-be-positioned node sends the fine timing measurement action frame, $t_2$ indicates the second receiving time, $t_3$ indicates the sending time at which the second to-be-positioned node sends the fine timing measurement response frame, and $t_4$ indicates the first receiving time.

The second determining subunit 122 is configured to determine a time of flight difference between a time of flight between each of the at least three collaborative nodes with known positions and the first to-be-positioned node, and a time of flight between each of the at least three collaborative nodes with known positions and the second to-be-positioned node according to the time of flight between the first to-be-positioned node and the second to-be-positioned node, the first time information, and the third time information, where the time of flight difference includes a difference between a time of flight between any one of the at least three collaborative nodes with known positions and the first to-be-positioned node, and a time of flight between the any collaborative node and the second to-be-positioned node.

In an implementation, the second determining subunit 122 obtains the difference between the time of flight between the any collaborative node $S_N$ and the first to-be-positioned node $U_1$, and the time of flight between $S_N$ and the second to-be-positioned node $U_2$ according to the following Formula 2:

$$\text{TOF}(U_1-S_N)-\text{TOF}(U_2-S_N)=t_{2\_}S_N-t_{3\_}S_N+(t_4-t_1)-\text{TOF}(U_1-U_2),\quad \text{(Formula 2)}$$

where $\text{TOF}(U_1-U_2)$ indicates the time of flight between the first to-be-positioned node and the second to-be-positioned node, $\text{TOF}(U_1-S_N)$ indicates the time of flight between the any collaborative node $S_N$ and the first to-be-positioned node $U_1$, $\text{TOF}(U_2-S_N)$ indicates the time of flight between the any collaborative node $S_N$ and the second to-be-positioned node $U_2$, $t_{2\_}S_N$ indicates a receiving time at which $S_N$ receives the fine timing measurement action frame, and $t_{3\_}S_N$ indicates a receiving time at which $S_N$ receives the fine timing measurement response frame.

The third determining subunit 123 is configured to determine the position information of the first to-be-positioned node and the position information of the second to-be-positioned node according to the time of flight difference, the position information of the at least three collaborative nodes with known positions, and the time of flight between the first to-be-positioned node and the second to-be-positioned node.

In an implementation, the third determining subunit calculates coordinates of U1 and coordinates of U2 according to Formula 3 and Formula 4, where in this embodiment of this application, the coordinates of $U_1$ are used to represent position information of $U_1$, and the coordinates of $U_2$ are used to represent position information of $U_2$:

$$\sqrt{(a_N-x_1)^2+(b_N-y_1)^2}-\sqrt{(a_N-x_2)^2+(b_N-y_2)^2}=(\text{TOF}(U_1-S_N)-\text{TOF}(U_2-S_N))*c,\quad \text{(Formula 3)}$$

$$\sqrt{(x_2-x_1)^2+(y_2-y_1)^2}=\text{TOF}(U_1-U_2)*c.\quad \text{(Formula 4)}$$

By calculating the coordinates of U1 and the coordinates of U2 according to Formula 1, Formula 2, Formula 3, and Formula 4, the determining unit can eliminate an error caused because internal clocks of the first to-be-positioned node, the second to-be-positioned node, and the at least three collaborative nodes with known positions cannot be aligned, thereby improving calculation precision.

It can be learned from the foregoing technical solution that the position information of the first to-be-positioned node and the position information of the second to-be-positioned node can be obtained by using one FTM handshake between the first to-be-positioned node and the second to-be-positioned node. In this case, when there are N to-be-positioned nodes, if N is an even number, the N to-be-positioned nodes may obtain their position information by using N/2 FTM handshakes between the N to-be-positioned nodes; or if N is an odd number, the N to-be-positioned nodes may obtain their position information by using (N/2)+1 FTM handshakes between the N to-be-positioned nodes. Compared with the prior art in which position information of N to-be-positioned nodes are obtained by using 2N FTM handshakes, in this application, a quantity of FTM handshakes is decreased. Therefore, signaling overheads in a network are reduced.

Figure 10:
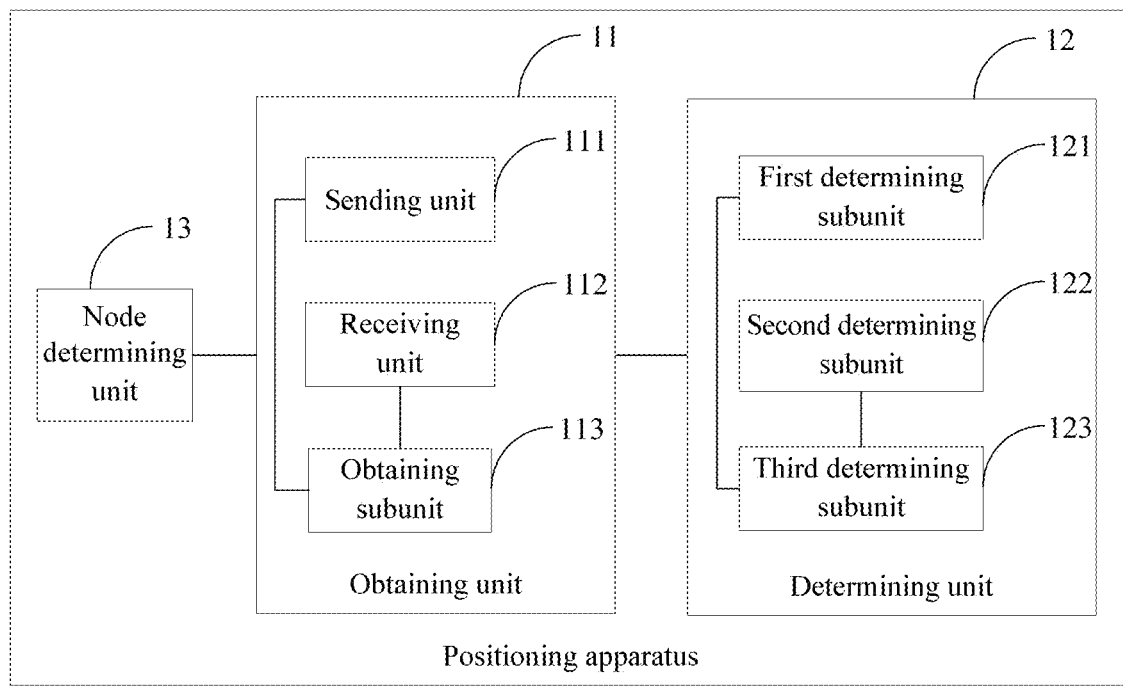
FIG. 10 is another schematic structural diagram of a positioning apparatus according to an embodiment of this application.

In this embodiment of this application, the positioning apparatus shown in FIG. 9 is the first to-be-positioned node. In addition to the units shown in FIG. 9, the positioning apparatus further includes a node determining unit 13. The obtaining unit 11 includes a sending unit 111, a receiving unit 112, and an obtaining subunit 113, as shown in FIG. 10.

The node determining unit 13 is configured to determine the second to-be-positioned node that performs fine timing measurement with the first to-be-positioned node. In this embodiment of this application, implementations of determining the second to-be-positioned node by the node determining unit 13 include but are not limited to the following two implementations:

In one implementation, the node determining unit 13 is configured to: make the sending unit 111 send a signaling request to a management node; obtain a response message sent by the management node and received by the receiving unit 112, where the signaling request is used to request to perform fine timing measurement; and determine the second to-be-positioned node when the response message is used to instruct to perform fine timing measurement between the first to-be-positioned node and the second to-be-positioned node.

In another implementation, the node determining unit 13 is configured to: make the sending unit 111 send a ranging request in a broadcast mode, and obtain a ranging response message sent by the second to-be-positioned node and received by the receiving unit 112, to determine the second to-be-positioned node.

An implementation of obtaining the first time information of the first to-be-positioned node by the obtaining unit 11 is: The sending unit 111 sends the fine timing measurement action frame, the obtaining subunit 113 obtains the sending time of the timing measurement action frame, the receiving unit 112 receives the fine timing measurement response frame sent by the second to-be-positioned node, and the obtaining subunit 113 obtains the first receiving time.

An implementation of obtaining the second time information of the second to-be-positioned node by the obtaining unit 11 is: The receiving unit 112 receives the second time information sent by the second to-be-positioned node.

An implementation of obtaining the position information of the at least three collaborative nodes with known positions and the third time information of the at least three collaborative nodes with known positions by the obtaining unit 11 is: The receiving unit 112 receives the position information of the at least three collaborative nodes and the third time information that are sent by the at least three collaborative nodes.

The sending unit 111 is further configured to send the position information of the second to-be-positioned node to the second to-be-positioned node.

It can be learned from the foregoing technical solution that the first to-be-positioned node can calculate the position information of the first to-be-positioned node and the second to-be-positioned node, thereby reducing a calculation amount of the second to-be-positioned node.

Figure 11:
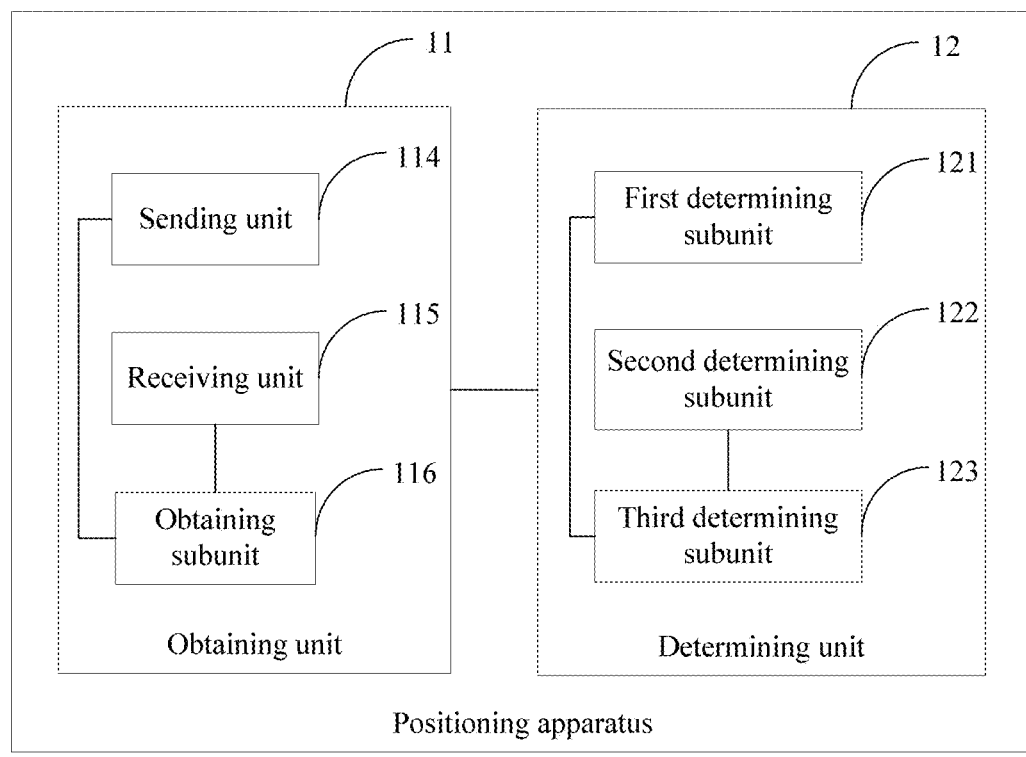
FIG. 11 is still another schematic structural diagram of a positioning apparatus according to an embodiment of this application.

In this embodiment of this application, the positioning apparatus shown in FIG. 9 is the second to-be-positioned node. The obtaining unit 11 in the positioning apparatus includes a sending unit 114, a receiving unit 115, and an obtaining subunit 116, as shown in FIG. 11.

An implementation of obtaining the second time information of the second to-be-positioned node by the obtaining unit 11 is: The receiving unit 115 receives the fine timing measurement action frame sent by the first to-be-positioned node, the obtaining subunit 116 obtains the second receiving time, the sending unit 114 sends the fine timing measurement response frame, and the obtaining subunit 116 is further configured to obtain the sending time of the fine timing measurement response frame.

An implementation of obtaining the first time information of the first to-be-positioned node by the obtaining unit 11 is: The receiving unit 115 receives the first time information sent by the first to-be-positioned node.

An implementation of obtaining the position information of the at least three collaborative nodes with known positions and the third time information of the at least three collaborative nodes with known positions by the obtaining unit 11 is: The receiving unit 115 receives the position information of the at least three collaborative nodes and the third time information that are sent by the at least three collaborative nodes.

The sending unit 114 is further configured to send the position information of the first to-be-positioned node to the first to-be-positioned node.

It can be learned from the foregoing technical solution that the second to-be-positioned node can calculate the position information of the second to-be-positioned node and the first to-be-positioned node, thereby reducing a calculation amount of the first to-be-positioned node.

Figure 12:
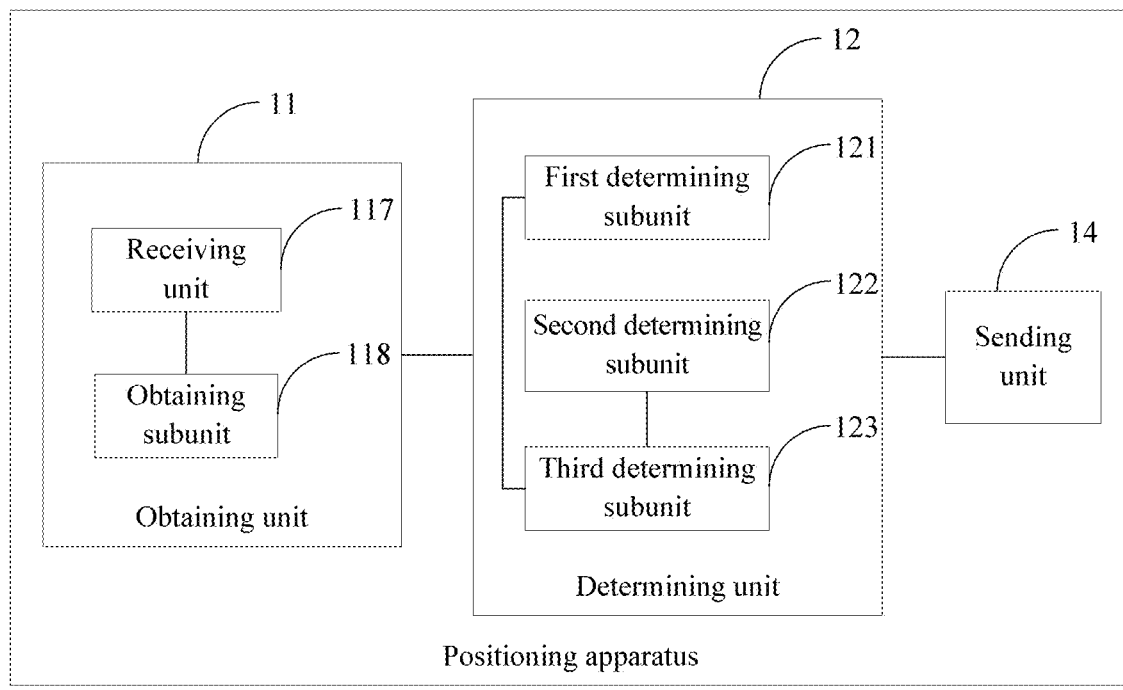
FIG. 12 is still another schematic structural diagram of a positioning apparatus according to an embodiment of this application.

In this embodiment of this application, the positioning apparatus shown in FIG. 9 is the any one of the at least three collaborative nodes with known positions. The positioning apparatus further includes a sending unit 14, and the obtaining unit 11 includes a receiving unit 117 and an obtaining subunit 118, as shown in FIG. 12.

An implementation of obtaining the first time information of the first to-be-positioned node by the obtaining unit 11 is: The receiving unit 117 receives the first time information sent by the first to-be-positioned node.

An implementation of obtaining the second time information of the second to-be-positioned node by the obtaining unit 11 is: The receiving unit 117 receives the second time information sent by the second to-be-positioned node.

An implementation of obtaining the position information of the at least three collaborative nodes with known positions and the third time information of the at least three collaborative nodes with known positions by the obtaining unit 11 is: The obtaining subunit 118 obtains position information of the any collaborative node; the receiving unit 117 receives the fine timing measurement action frame sent by the first to-be-positioned node, and the obtaining subunit 118 obtains a receiving time at which the any collaborative node receives the fine timing measurement action frame; the receiving unit 117 receives the fine timing measurement response frame sent by the second to-be-positioned node, and the obtaining subunit obtains a receiving time at which the any collaborative node receives the fine timing measurement response frame; and the receiving unit 117 receives position information of other collaborative nodes of the at least three collaborative nodes, receiving time at which the other collaborative nodes receive the fine timing measurement action frame, and receiving time at which the other collaborative nodes receive the fine timing measurement response frame.

The sending unit 14 is configured to: send the position information of the first to-be-positioned node to the first to-be-positioned node, and send the position information of the second to-be-positioned node to the second to-be-positioned node.

It can be learned from the foregoing technical solution that, the any one of the at least three collaborative nodes with known positions can calculate the position information of the first to-be-positioned node and the second to-be-positioned node, and after calculating the position information, send the position information of the first to-be-positioned node to the first to-be-positioned node and send the position information of the second to-be-positioned node to the second to-be-positioned node, thereby reducing calculation amounts of the first to-be-positioned node and the second to-be-positioned node.

Figure 13:
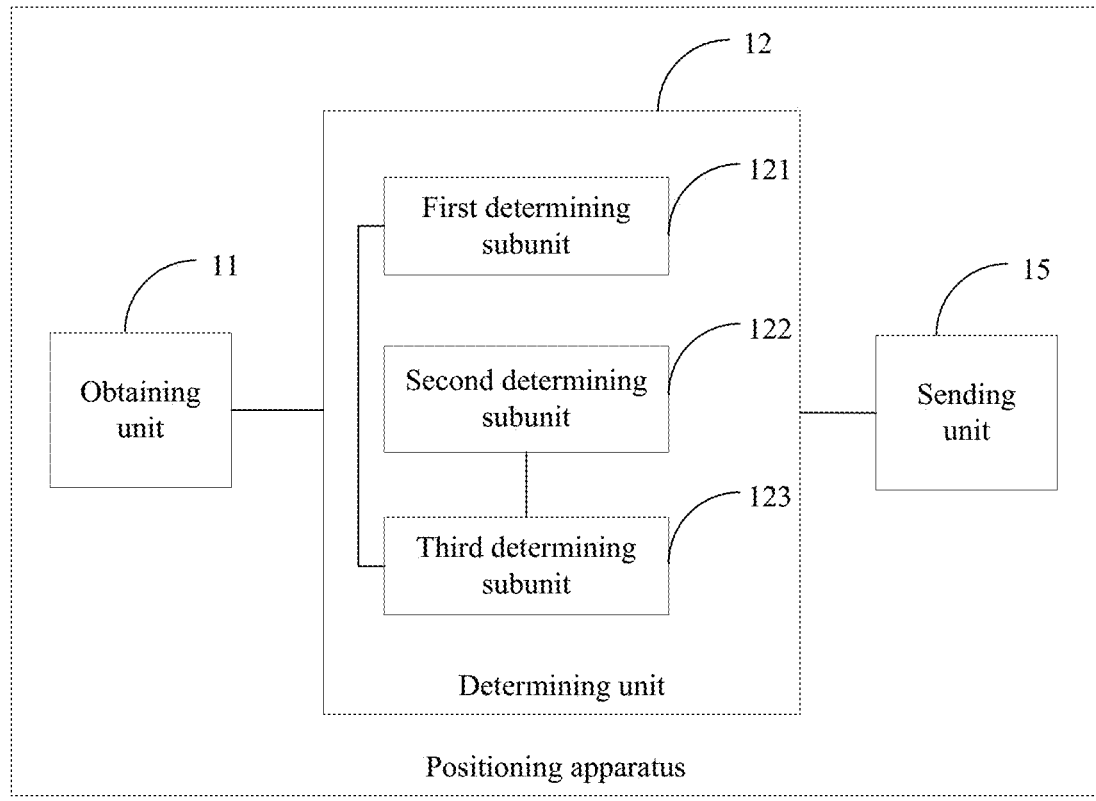
FIG. 13 is still another schematic structural diagram of a positioning apparatus according to an embodiment of this application.

In this embodiment of this application, the positioning apparatus shown in FIG. 9 is a management node. The positioning apparatus further includes a sending unit 15, as shown in FIG. 13.

An implementation of obtaining the first time information of the first to-be-positioned node by the obtaining unit 11 is: The obtaining unit 11 is configured to receive the first time information sent by the first to-be-positioned node.

An implementation of obtaining the second time information of the second to-be-positioned node by the obtaining unit 11 is: The obtaining unit 11 is configured to receive the second time information sent by the second to-be-positioned node.

An implementation of obtaining the position information of the at least three collaborative nodes with known positions and the third time information of the at least three collaborative nodes with known positions by the obtaining unit 11 is: The obtaining unit 11 is configured to receive the position information of the at least three collaborative nodes and the third time information that are sent by the at least three collaborative nodes.

The sending unit 15 is configured to: send the position information of the first to-be-positioned node to the first to-be-positioned node, and send the position information of the second to-be-positioned node to the second to-be-positioned node.

It can be learned from the foregoing technical solution that, the management node can calculate the position information of the first to-be-positioned node and the second to-be-positioned node, and after calculating the position information, send the position information of the first to-be-positioned node to the first to-be-positioned node and send the position information of the second to-be-positioned node to the second to-be-positioned node, thereby reducing calculation amounts of the first to-be-positioned node and the second to-be-positioned node.

Figure 14:
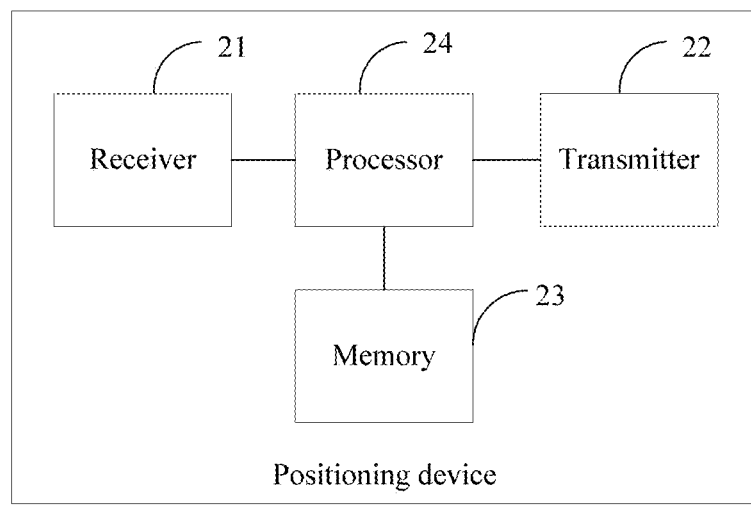
FIG. 14 is a schematic structural diagram of a positioning device according to an embodiment of this application.

In addition, with reference to the collaborative positioning framework shown in FIG. 1, an embodiment of this application further provides a positioning device shown in FIG. 14. The positioning device includes a transmitter 21, a receiver 22, a memory 23, and a processor 24.

The processor 24 is configured to: obtain first time information of a first to-be-positioned node, second time information of a second to-be-positioned node, position information of at least three collaborative nodes with known positions, and third time information of the at least three collaborative nodes with known positions; and determine position information of the first to-be-positioned node and position information of the second to-be-positioned node according to the obtained first time information, second time information, third time information, and position information of the at least three collaborative nodes with known positions.

The third time information includes receiving time at which the at least three collaborative nodes receive a fine timing measurement action frame and receiving time at which the at least three collaborative nodes receive a fine timing measurement response frame. The first time information includes a sending time at which the first to-be-positioned node sends the fine timing measurement action frame and a first receiving time at which the first to-be-positioned node receives the fine timing measurement response frame. The second time information includes a second receiving time at which the second to-be-positioned node receives the fine timing measurement action frame and a sending time at which the second to-be-positioned node sends the fine timing measurement response frame.

The memory 23 is configured to store the first time information of the first to-be-positioned node, the second time information of the second to-be-positioned node, the position information of the at least three collaborative nodes with known positions, and the third time information of the at least three collaborative nodes with known positions.

In this embodiment of this application, an implementation of determining, by the processor 24, the position information of the first to-be-positioned node and the position information of the second to-be-positioned node according to the obtained first time information, second time information, third time information, and position information of the at least three collaborative nodes with known positions is described in the following. The processor 24 determines a time of flight between the first to-be-positioned node and the second to-be-positioned node according to the first time information and the second time information; determines a time of flight difference between a time of flight between each of the at least three collaborative nodes with known positions and the first to-be-positioned node, and a time of flight between each of the at least three collaborative nodes with known positions and the second to-be-positioned node according to the time of flight between the first to-be-positioned node and the second to-be-positioned node, the first time information, and the third time information, where the time of flight difference includes a difference between a time of flight between any one of the at least three collaborative nodes with known positions and the first to-be-positioned node, and a time of flight between the any collaborative node and the second to-be-positioned node; and determines the position information of the first to-be-positioned node and the position information of the second to-be-positioned node according to the time of flight difference, the position information of the at least three collaborative nodes with known positions, and the time of flight between the first to-be-positioned node and the second to-be-positioned node.

In an implementation, the processor 24 calculates a time of flight TOF ($U_1$–$U_2$) between U1 and U2 according to Formula 1:

$$\text{TOF}(U_1-U_2)=((t_4-t_1)-(t_3-t_2))/2 \quad \text{(Formula 1)},$$

where $U_1$ indicates the first to-be-positioned node $U_1$, $U_2$ indicates the second to-be-positioned node $U_2$, $t_1$ indicates the sending time at which the first to-be-positioned node sends the fine timing measurement action frame, $t_2$ indicates the second receiving time, $t_3$ indicates the sending time at which the second to-be-positioned node sends the fine timing measurement response frame, and $t_4$ indicates the first receiving time.

In an implementation, the processor 24 obtains the difference between the time of flight between the any collaborative node $S_N$ and the first to-be-positioned node $U_1$, and the time of flight between $S_N$ and the second to-be-positioned node $U_2$ according to the following Formula 2:

$$\text{TOF}(U_1-S_N)-\text{TOF}(U_2-S_N)=t_2\_S_N-t_3\_S_N+(t_4-t_1)-\text{TOF}(U_1-U_2), \quad \text{(Formula 2)}$$

where $\text{TOF}(U_1-U_2)$ indicates the time of flight between the first to-be-positioned node and the second to-be-positioned node, $\text{TOF}(U_1-S_N)$ indicates the time of flight between the any collaborative node $S_N$ and the first to-be-positioned node $U_1$, $\text{TOF}(U_2-S_N)$ indicates the time of flight between the any collaborative node $S_N$ and the second to-be-positioned node $U_2$, $t_2\_S_N$ indicates a receiving time at which $S_N$ receives the fine timing measurement action frame, and $t_3\_S_N$ indicates a receiving time at which $S_N$ receives the fine timing measurement response frame.

In an implementation, the processor 24 calculates coordinates of U1 and coordinates of U2 according to Formula 3 and Formula 4, where in this embodiment of this application, the coordinates of U1 are used to represent position information of U1, and the coordinates of U2 are used to represent position information of U2:

$$\sqrt{(a_N-x_1)^2+(b_N-y_1)^2} - \sqrt{(a_N-x_2)^2+(b_N-y_2)^2}=(\text{TOF}(U_1-S_N)-\text{TOF}(U_2-S_N))*c, \quad \text{(Formula 3)}$$

$$\sqrt{(x_2-x_1)^2+(y_2-y_1)^2}=\text{TOF}(U_1-U_2)*c. \quad \text{(Formula 4)}$$

By calculating the coordinates of U1 and the coordinates of U2 according to Formula 1, Formula 2, Formula 3, and Formula 4, when calculating the coordinates of the first to-be-positioned node and the coordinates of the second to-be-positioned node, the processor 24 can eliminate an error caused because internal clocks of the first to-be-positioned node, the second to-be-positioned node, and the at least three collaborative nodes with known positions cannot be aligned, thereby improving calculation precision.

It can be learned from the foregoing technical solution that the position information of the first to-be-positioned node and the position information of the second to-be-positioned node can be obtained by using one FTM handshake between the first to-be-positioned node and the second to-be-positioned node. In this case, when there are N to-be-positioned nodes, if N is an even number, the N to-be-positioned nodes may obtain their position information by using N/2 FTM handshakes between the N to-be-positioned nodes; or if N is an odd number, the N to-be-positioned nodes may obtain their position information by using (N/2)+1 FTM handshakes between the N to-be-positioned nodes. Compared with the prior art in which position information of N to-be-positioned nodes are obtained by using 2N FTM handshakes, in this application, a quantity of FTM handshakes is decreased. Therefore, signaling overheads in a network are reduced.

In an implementation, the positioning device is the first to-be-positioned node in FIG. 2, and an implementation of obtaining, by the processor 24, the first time information of the first to-be-positioned node, the second time information of the second to-be-positioned node, the position information of the at least three collaborative nodes with known positions, and the third time information of the at least three collaborative nodes with known positions includes the following. The processor 24 makes the transmitter 21 send the fine timing measurement action frame, the processor 24 obtains the sending time of the timing measurement action frame, the processor 24 makes the receiver 22 receive the fine timing measurement response frame sent by the second to-be-positioned node, and the processor 24 obtains the first receiving time; the processor 24 makes the receiver 22 receive the second time information sent by the second to-be-positioned node; and the processor 24 makes the receiver 22 receive the position information of the at least three collaborative nodes and the third time information that are sent by the at least three collaborative nodes.

In addition, the processor 24 is further configured to determine the second to-be-positioned node that performs fine timing measurement with the first to-be-positioned node. In this embodiment of this application, implementations of determining, by the processor 24, the second to-be-positioned node that performs fine timing measurement with the first to-be-positioned node include but are not limited to the following two implementations.

In one implementation, the processor 24 makes the transmitter 21 send a signaling request to a management node; obtains a response message sent by the management node and received by the receiver 22, where the signaling request is used to request to perform fine timing measurement; and determines the second to-be-positioned node when the response message is used to instruct to perform fine timing measurement between the first to-be-positioned node and the second to-be-positioned node.

In another implementation, the processor 24 makes the transmitter 21 send a ranging request in a broadcast mode, and obtains a ranging response message sent by the second to-be-positioned node and received by the receiver 22, to determine the second to-be-positioned node.

The transmitter 21 is configured to send the position information of the second to-be-positioned node to the second to-be-positioned node.

It can be learned from the foregoing technical solution that the first to-be-positioned node can calculate the position information of the first to-be-positioned node and the second to-be-positioned node, thereby reducing a calculation amount of the second to-be-positioned node.

In an implementation, the positioning device is the second to-be-positioned node in FIG. 2, and an implementation of obtaining, by the processor 24, the first time information of the first to-be-positioned node, the second time information of the second to-be-positioned node, the position information of the at least three collaborative nodes with known positions, and the third time information of the at least three collaborative nodes with known positions is described in the following. The processor 24 makes the receiver 22 receive the fine timing measurement action frame sent by the first to-be-positioned node, the processor 24 obtains the second receiving time, the processor 24 makes the transmitter 21 send the fine timing measurement response frame, and the processor 24 obtains the sending time of the fine timing measurement response frame; the processor 24 makes the receiver 22 receive the first time information sent by the first to-be-positioned node; and the processor 24 makes the receiver 22 receive the position information of the at least three collaborative nodes and the third time information that are sent by the at least three collaborative nodes.

The transmitter 21 is further configured to send the position information of the first to-be-positioned node to the first to-be-positioned node.

It can be learned from the foregoing technical solution that the second to-be-positioned node can calculate the position information of the second to-be-positioned node and the first to-be-positioned node, thereby reducing a calculation amount of the first to-be-positioned node.

In an implementation, the positioning device is any one of the at least three collaborative nodes with known positions in FIG. 2, and an implementation of obtaining, by the processor 24, the first time information of the first to-be-positioned node, the second time information of the second to-be-positioned node, the position information of the at least three collaborative nodes with known positions, and the third time information of the at least three collaborative nodes with known positions is described in the following. The processor 24 makes the receiver 22: receive the first time information sent by the first to-be-positioned node; receive the second time information sent by the second to-be-positioned node; and receive position information of other collaborative nodes of the at least three collaborative nodes that is sent by the other collaborative nodes, receiving time at which the other collaborative nodes receive the fine timing measurement action frame, and receiving time at which the other collaborative nodes receive the fine timing measurement response frame; and the processor 24 obtains position information of the any collaborative node, the processor 24 makes the receiver 22 receive the fine timing measurement action frame sent by the first to-be-positioned node, and the processor 24 obtains a receiving time at which the any collaborative node receives the fine timing measurement action frame.

The transmitter 21 is configured to: send the position information of the first to-be-positioned node to the first to-be-positioned node, and send the position information of the second to-be-positioned node to the second to-be-positioned node.

It can be learned from the foregoing technical solution that, the any one of the at least three collaborative nodes with known positions can calculate the position information of the first to-be-positioned node and the second to-be-positioned node, and after calculating the position information, send the position information of the first to-be-positioned node to the first to-be-positioned node and send the position information of the second to-be-positioned node to the second to-be-positioned node, thereby reducing calculation amounts of the first to-be-positioned node and the second to-be-positioned node.

In an implementation, the positioning device may be the management node in FIG. 2, for example, the AP, and an implementation of obtaining, by the processor 24, the first time information of the first to-be-positioned node, the second time information of the second to-be-positioned node, the position information of the at least three collaborative nodes with known positions, and the third time information of the at least three collaborative nodes with known positions is described in the following. The processor 24 makes the receiver 22 receive the first time information sent by the first to-be-positioned node; makes the receiver 22 receive the second time information sent by the second to-be-positioned node; and makes the processor 22 receive the position information of the at least three collaborative nodes and the third time information that are sent by the at least three collaborative nodes.

The transmitter 21 is configured to: send the position information of the first to-be-positioned node to the first to-be-positioned node, and send the position information of the second to-be-positioned node to the second to-be-positioned node.

It can be learned from the foregoing technical solution that, the management node can calculate the position information of the first to-be-positioned node and the second to-be-positioned node, and after calculating the position information, send the position information of the first to-be-positioned node to the first to-be-positioned node and send the position information of the second to-be-positioned node to the second to-be-positioned node, thereby reducing calculation amounts of the first to-be-positioned node and the second to-be-positioned node.

In addition, an embodiment of this application further provides a storage medium, where the storage medium records program code used for executing a positioning method by any one or more of the first to-be-positioned node, the second to-be-positioned node, the any one of at least three collaborative nodes with known positions, or the management node.

The embodiments in this specification are all described in a progressive manner. Each embodiment focuses on a difference from other embodiments. For same or similar parts in the embodiments, mutual reference may be made between these embodiments.

The embodiments disclosed above are described to make a person skilled in the art implement or use the present disclosure. Various modifications to the embodiments are obvious to the person skilled in the art, and general principles defined in this specification may be implemented in other embodiments without departing from the scope of the present disclosure. Therefore, the present disclosure is not intended to be limited to these embodiments illustrated in this specification, but shall be construed in the widest scope consistent with the principles and novel features disclosed in this specification.

What is claimed is:

1. A computer-implemented method comprising:
    obtaining, by an apparatus, first time information of a first to-be-positioned node whose position is to be determined, wherein the first time information comprises a first sending time at which the first to-be-positioned node sends a fine timing measurement action frame, and a first receiving time at which the first to-be-positioned node receives, from a second to-be-positioned node whose position is to be determined, a fine timing measurement response frame in response to sending the fine timing measurement action frame;
    obtaining, by the apparatus, second time information of the second to-be-positioned node whose position is to be determined, wherein the second time information comprises a second receiving time at which the second to-be-positioned node receives the fine timing measurement action frame from the first to-be-positioned node and a second sending time at which the second to-be-positioned node sends the fine timing measurement response frame in response to receiving the fine timing measurement action frame from the first to-be-positioned node;
    obtaining, by the apparatus, position information of at least three collaborative nodes with known positions and third time information of each of the at least three collaborative nodes with known positions, wherein the third time information of a respective collaborative node comprises a third receiving time at which the respective collaborative node receives the fine timing measurement action frame from the first to-be-positioned node and a fourth receiving time at which the respective collaborative node receives the fine timing measurement response frame from the second to-be-positioned node; and
    determining, by the apparatus, both position information of the first to-be-positioned node and position information of the second to-be-positioned node according to the obtained first time information, the obtained second time information, the obtained third time information, and the position information of the at least three collaborative nodes with known positions.

2. The computer-implemented method according to claim 1, wherein determining the position information of the first to-be-positioned node and the position information of the second to-be-positioned node according to the first time information, the second time information, the third time information, and the position information of the at least three collaborative nodes with known positions comprises:
    determining, by the apparatus, a first time of flight between the first to-be-positioned node and the second to-be-positioned node according to the first time information and the second time information;
    determining, by the apparatus, a time of flight difference for each of the at least three collaborative nodes with known positions according to the first time of flight between the first to-be-positioned node and the second to-be-positioned node, the first time information, and the third time information, the time of flight difference for the respective collaborative node being between a second time of flight of the respective collaborative node and a third time of flight of the respective collaborative node, wherein the second time of flight is between the respective collaborative node and the first to-be-positioned node, and the third time of flight is between the respective collaborative node and the second to-be-positioned node; and
    determining, by the apparatus, the position information of the first to-be-positioned node and the position information of the second to-be-positioned node according to the time of flight difference for each of the at least three collaborative nodes, the position information of the at least three collaborative nodes with known positions, and the first time of flight between the first to-be-positioned node and the second to-be-positioned node.

3. The computer-implemented method according to claim 1, wherein the apparatus is the first to-be-positioned node and the computer-implemented method is executed by the first to-be-positioned node;
    obtaining the first time information of the first to-be-positioned node comprises:
        sending the fine timing measurement action frame, and obtaining the first sending time of the fine timing measurement action frame; and
        receiving the fine timing measurement response frame sent by the second to-be-positioned node, and obtaining the first receiving time; and
    obtaining the second time information of the second to-be-positioned node comprises:
        receiving the second time information sent by the second to-be-positioned node.

4. The computer-implemented method according to claim 1, wherein the apparatus is the second to-be-positioned node and the computer-implemented method is executed by the second to-be-positioned node;
    obtaining the second time information of the second to-be-positioned node comprises:

receiving the fine timing measurement action frame sent by the first to-be-positioned node, and obtaining the second receiving time; and sending the fine timing measurement response frame, and obtaining the second sending time of the fine timing measurement response frame; and obtaining the first time information of the first to-be-positioned node comprises:

receiving the first time information sent by the first to-be-positioned node.

5. The computer-implemented method according to claim 1, wherein obtaining the position information of the at least three collaborative nodes with known positions and the third time information of each of the at least three collaborative nodes with known positions comprises: receiving the position information of the at least three collaborative nodes and the third time information that are sent by the at least three collaborative nodes.

6. The computer-implemented method according to claim 1, wherein the apparatus is a first collaborative node of the at least three collaborative nodes with known positions and the computer-implemented method is executed by the first collaborative node of the at least three collaborative nodes with known positions; obtaining the first time information of the first to-be-positioned node comprises: receiving the first time information sent by the first to-be-positioned node;

obtaining the second time information of the second to-be-positioned node comprises: receiving the second time information sent by the second to-be-positioned node; and obtaining the position information of the at least three collaborative nodes with known positions and the third time information of each of the at least three collaborative nodes with known positions comprises:

obtaining position information of the first collaborative node;

receiving the fine timing measurement action frame sent by the first to-be-positioned node, and obtaining the third receiving time of the first collaborative node at which the first collaborative node receives the fine timing measurement action frame;

receiving the fine timing measurement response frame sent by the second to-be-positioned node, and obtaining the fourth receiving time of the first collaborative node at which the first collaborative node receives the fine timing measurement response frame; and receiving position information of rest collaborative nodes of the at least three collaborative nodes that is sent by the rest collaborative nodes, the third receiving time of each of the rest collaborative nodes at which each of the rest collaborative nodes receives the fine timing measurement action frame, and the fourth receiving time of each of the rest collaborative nodes at which each of the rest collaborative nodes receives the fine timing measurement response frame.

7. The computer-implemented method according to claim 1, wherein the apparatus is a management node and the computer-implemented method is executed by the management node;

obtaining the first time information of the first to-be-positioned node comprises: receiving the first time information sent by the first to-be-positioned node;

obtaining the second time information of the second to-be-positioned node comprises: receiving the second time information sent by the second to-be-positioned node; and obtaining the position information of the at least three collaborative nodes with known positions and the third time information of each of the at least three collaborative nodes with known positions comprises: receiving the position information of the at least three collaborative nodes and the third time information that are sent by the at least three collaborative nodes.

8. The computer-implemented method according to claim 1, wherein the apparatus is the first to-be-positioned node and the computer-implemented method is executed by the first to-be-positioned node, and the computer-implemented method further comprises: sending the position information of the second to-be-positioned node to the second to-be-positioned node; or the computer-implemented method is executed by the second to-be-positioned node, and the computer-implemented method further comprises: sending the position information of the first to-be-positioned node to the first to-be-positioned node; or the computer-implemented method is executed by one of the at least three collaborative nodes with known positions or a management node, and the computer-implemented method further comprises: sending the position information of the first to-be-positioned node to the first to-be-positioned node, and sending the position information of the second to-be-positioned node to the second to-be-positioned node.

9. The computer-implemented method according to claim 2, wherein determining the time of flight difference for each of the at least three collaborative nodes with known positions comprises:

obtaining the time of flight difference for a collaborative node $S_N$ between the second time of flight, which is between the collaborative node $S_N$ and the first to-be-positioned node $U_1$, and the third time of flight, which is between the collaborative node $S_N$ and the second to-be-positioned node $U_2$, according to a formula of: TOF $(U_1-S_N)$-TOF$(U_2-S_N)$=$t_{2\_}S_N$-$t_{3\_}S_N$+$(t_4-t_1)$-TOF $(U_1-U_2)$, wherein TOF $(U_1-U_2)$ indicates the first time of flight between the first to-be-positioned node and the second to-be-positioned node, TOF$(U_1-S_N)$ indicates the second time of flight between the collaborative node $S_N$ and the first to-be-positioned node $U_1$, TOF$(U_2-S_N)$ indicates the third time of flight between the collaborative node $S_N$ and the second to-be-positioned node $U_2$, $t_1$ indicates the first sending time at which the first to-be-positioned node sends the fine timing measurement action frame, $t_4$ indicates the first receiving time, $t_{2\_}S_N$ indicates the third receiving time at which $S_N$ receives the fine timing measurement action frame, and $t_{3\_}S_N$ indicates the fourth receiving time at which $S_N$ receives the fine timing measurement response frame.

10. An apparatus comprising:

a non-transitory memory storage comprising instructions; and one or more processors in communication with the memory storage, wherein the one or more processors execute the instructions to:

obtain first time information of a first to-be-positioned node whose position is to be determined, wherein the first time information comprises a first sending time at which the first to-be-positioned node sends a fine timing measurement action frame and a first receiving time at which the first to-be-positioned node receives, from a second to-be-positioned node whose position is to be determined, a fine timing measurement response frame in response to sending the fine timing measurement action frame;

obtain second time information of the second to-be-positioned node whose position is to be determined, wherein the second time information comprises a second receiving time at which the second to-be-positioned node receives the fine timing measurement action frame from the first to-be-positioned node and a second sending time at which the second to-be-positioned node sends the fine timing measurement response frame in response to receiving the fine timing measurement action frame from the first to-be-positioned node;

obtain position information of at least three collaborative nodes with known positions and obtain third time information of each of the at least three collaborative nodes with known positions, wherein the third time information of a respective collaborative node comprises a third receiving time at which the respective collaborative node receives the fine timing measurement action frame from the first to-be-positioned node and a fourth receiving time at which the respective collaborative node receives the fine timing measurement response frame from the second to-be-positioned node; and determine both position information of the first to-be-positioned node and position information of the second to-be-positioned node according to the obtained first time information, the obtained second time information, the obtained third time information, and the position information of the at least three collaborative nodes with known positions.

11. The apparatus according to claim 10, wherein the one or more processors execute the instructions further to:
determine a first time of flight between the first to-be-positioned node and the second to-be-positioned node according to the first time information and the second time information;
determine a time of flight difference for each of the at least three collaborative nodes with known positions according to the first time of flight between the first to-be-positioned node and the second to-be-positioned node, the first time information, and the third time information, the time of flight difference for the respective collaborative node being between a second time of flight of the respective collaborative node and a third time of flight of the respective collaborative node, wherein the second time of flight is between the respective collaborative node and the first to-be-positioned node, and the third time of flight is between the respective collaborative node and the second to-be-positioned node; and
determine the position information of the first to-be-positioned node and the position information of the second to-be-positioned node according to the time of flight difference for each of the at least three collaborative nodes, the position information of the at least three collaborative nodes with known positions, and the first time of flight between the first to-be-positioned node and the second to-be-positioned node.

12. The apparatus according to claim 10, wherein the apparatus is the first to-be-positioned node;
obtaining the first time information of the first to-be-positioned node comprises: sending the fine timing measurement action frame, obtaining the first sending time of the fine timing measurement action frame, receiving the fine timing measurement response frame sent by the second to-be-positioned node, and obtaining the first receiving time; and
obtaining the second time information of the second to-be-positioned node comprises: receiving the second time information sent by the second to-be-positioned node.

13. The apparatus according to claim 10, wherein the apparatus is the second to-be-positioned node;
obtaining the second time information of the second to-be-positioned node comprises: receiving the fine timing measurement action frame sent by the first to-be-positioned node, obtaining the second receiving time, sending the fine timing measurement response frame, and obtaining the second sending time of the fine timing measurement response frame; and
obtaining the first time information of the first to-be-positioned node comprises: receiving the first time information sent by the first to-be-positioned node.

14. The apparatus according to claim 13, wherein the one or more processors execute the instructions further to send the position information of the first to-be-positioned node to the first to-be-positioned node.

15. The apparatus according to claim 12, wherein obtaining the position information of the at least three collaborative nodes with known positions and the third time information of each of the at least three collaborative nodes with known positions comprises: receiving the position information of the at least three collaborative nodes and the third time information that are sent by the at least three collaborative nodes.

16. The apparatus according to claim 10, wherein the apparatus is a first collaborative node of the at least three collaborative nodes with known positions;
obtaining the first time information of the first to-be-positioned node comprises: receiving the first time information sent by the first to-be-positioned node;
obtaining the second time information of the second to-be-positioned node comprises: receiving the second time information sent by the second to-be-positioned node; and
obtaining the position information of the at least three collaborative nodes with known positions and the third time information of the at least three collaborative nodes with known positions comprises:
obtaining position information of the first collaborative node;
receiving the fine timing measurement action frame sent by the first to-be-positioned node, and obtaining the third receiving time of the first collaborative node at which the first collaborative node receives the fine timing measurement action frame;
receiving the fine timing measurement response frame sent by the second to-be-positioned node, and obtaining the fourth receiving time of the first collaborative node at which the first collaborative node receives the fine timing measurement response frame; and
receiving position information of rest collaborative nodes of the at least three collaborative nodes that is sent by the rest collaborative nodes, the third receiving time of each of the rest collaborative nodes at which each of the rest collaborative nodes receives the fine timing measurement action frame, and the fourth receiving time of each of the rest collaborative nodes at which each of the rest collaborative nodes receives the fine timing measurement response frame.

17. The apparatus according to claim 10, wherein the apparatus is a management node;
   obtaining the first time information of the first to-be-positioned node comprises: receiving the first time information sent by the first to-be-positioned node;
   obtaining the second time information of the second to-be-positioned node comprises: receiving the second time information sent by the second to-be-positioned node; and
   obtaining the position information of the at least three collaborative nodes with known positions and the third time information of each of the at least three collaborative nodes with known positions comprises: receiving the position information of the at least three collaborative nodes and the third time information that are sent by the at least three collaborative nodes.

18. The apparatus according to claim 17, wherein the one or more processors execute the instructions further to: send the position information of the first to-be-positioned node to the first to-be-positioned node, and send the position information of the second to-be-positioned node to the second to-be-positioned node.

19. The apparatus according to claim 11, wherein the one or more processors execute the instructions further to:
   obtain the time of flight difference for a collaborative node $S_N$ between the second time of flight, which is between the collaborative node $S_N$ and the first to-be-positioned node $U_1$, and the third time of flight, which is between the collaborative node $S_N$ and the second to-be-positioned node $U_2$, according to a formula of: TOF $(U_1-S_N)$–TOF $(U_2-S_N)$=$t_2\_S_N$–$t_3\_S_N$+$(t_4-t_1)$–TOF $(U_1-U_2)$, wherein TOF $(U_1-U_2)$ indicates the first time of flight between the first to-be-positioned node and the second to-be-positioned node, TOF$(U_1-S_N)$ indicates the second time of flight between the collaborative node $S_N$ and the first to-be-positioned node $U_1$, TOF $(U_2-S_N)$ indicates the third time of flight between the collaborative node $S_N$ and the second to-be-positioned node $U_2$, $t_1$ indicates the first sending time at which the first to-be-positioned node sends the fine timing measurement action frame, $t_4$ indicates the first receiving time, $t_2\_S_N$ indicates the third receiving time at which $S_N$ receives the fine timing measurement action frame, and $t_3\_S_N$ indicates the fourth receiving time at which $S_N$ receives the fine timing measurement response frame.

* * * * *